US007669086B2

(12) United States Patent
Gower et al.

(10) Patent No.: US 7,669,086 B2
(45) Date of Patent: Feb. 23, 2010

(54) SYSTEMS AND METHODS FOR PROVIDING COLLISION DETECTION IN A MEMORY SYSTEM

(75) Inventors: Kevin C. Gower, Lagrangeville, NY (US); Thomas J. Griffin, Salt Point, NY (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 11/461,933

(22) Filed: Aug. 2, 2006

(65) Prior Publication Data
US 2008/0115137 A1  May 15, 2008

(51) Int. Cl.
*G06F 11/00* (2006.01)
(52) U.S. Cl. ............... 714/43; 714/42; 714/48; 714/56; 711/150; 711/151; 711/152
(58) Field of Classification Search ......... 714/43, 714/48, 55, 56, 42; 711/5, 147–153
See application file for complete search history.

(56) References Cited

U.S. PATENT DOCUMENTS

| 2,842,682 A | 7/1958 | Clapper |
| 3,333,253 A | 7/1967 | Sahulka |
| 3,395,400 A | 7/1968 | De Witt |
| 3,825,904 A | 7/1974 | Burk et al. ............... 340/172.5 |
| 4,028,675 A | 6/1977 | Frankenberg ............... 711/106 |
| 4,135,240 A | 1/1979 | Ritchie |
| 4,150,428 A | 4/1979 | Inrig et al. |
| 4,472,780 A | 9/1984 | Chenoweth et al. |
| 4,475,194 A | 10/1984 | LaVallee et al. ............... 371/10 |
| 4,479,214 A | 10/1984 | Ryan |
| 4,486,739 A | 12/1984 | Franaszek et al. ........... 340/347 |
| 4,641,263 A | 2/1987 | Perlman et al. |
| 4,654,857 A | 3/1987 | Samson et al. |
| 4,723,120 A | 2/1988 | Petty, Jr. ................. 340/825.02 |
| 4,740,916 A | 4/1988 | Martin ....................... 364/900 |
| 4,782,487 A | 11/1988 | Smelser |
| 4,796,231 A | 1/1989 | Pinkham ................ 365/189.05 |
| 4,803,485 A | 2/1989 | Rypinksi ................... 370/452 |
| 4,833,605 A | 5/1989 | Terada et al. ................. 364/200 |

(Continued)

FOREIGN PATENT DOCUMENTS

EP  0229316 A2  7/1987

(Continued)

OTHER PUBLICATIONS

PCT International Search Report PCT/EP2006/068984. Mailed Feb. 16, 2007.

(Continued)

*Primary Examiner*—Philip Guyton
(74) *Attorney, Agent, or Firm*—Cantor Colburn LLP

(57) ABSTRACT

Systems and methods for providing collision detection in a memory system including a memory system for storing and retrieving data for a processing system. The memory system includes resource scheduling conflict logic for monitoring one or more memory resources for detecting resource scheduling conflicts. The memory system also includes error reporting logic for generating an error signal in response to detecting a resource scheduling conflict at one or more of the memory resources.

22 Claims, 12 Drawing Sheets

U.S. PATENT DOCUMENTS

| | | | | |
|---|---|---|---|---|
| 4,839,534 A | 6/1989 | Clasen | ................ | 307/269 |
| 4,943,984 A | 7/1990 | Pechanek et al. | ............ | 375/109 |
| 4,964,129 A | 10/1990 | Bowden, III et al. | | |
| 4,964,130 A | 10/1990 | Bowden, III et al. | | |
| 4,985,828 A | 1/1991 | Shimizu et al. | ............ | 364/200 |
| 5,053,947 A | 10/1991 | Heibel et al. | ................ | 364/200 |
| 5,177,375 A | 1/1993 | Ogawa et al. | | |
| 5,206,946 A | 4/1993 | Brunk | ............................ | 710/2 |
| 5,214,747 A | 5/1993 | Cok | ........................... | 395/27 |
| 5,265,049 A | 11/1993 | Takasugi | | |
| 5,265,212 A | 11/1993 | Bruce, II | .................... | 710/113 |
| 5,287,531 A | 2/1994 | Rogers, Jr. et al. | .......... | 395/800 |
| 5,347,270 A | 9/1994 | Matsuda et al. | ............ | 340/2.21 |
| 5,357,621 A | 10/1994 | Cox | | |
| 5,375,127 A | 12/1994 | Leak | | |
| 5,387,911 A | 2/1995 | Gleichert et al. | ............... | 341/95 |
| 5,394,535 A | 2/1995 | Ohuchi | ....................... | 711/155 |
| 5,410,545 A | 4/1995 | Porter et al. | | |
| 5,454,091 A | 9/1995 | Sites et al. | .................... | 395/413 |
| 5,475,690 A | 12/1995 | Burns et al. | ............... | 370/105.3 |
| 5,513,135 A | 4/1996 | Dell et al. | ..................... | 365/52 |
| 5,517,626 A | 5/1996 | Archer et al. | | |
| 5,522,064 A | 5/1996 | Aldereguia et al. | | |
| 5,537,621 A | 7/1996 | Charlot et al. | | |
| 5,544,309 A | 8/1996 | Chang et al. | | |
| 5,546,023 A | 8/1996 | Borkar et al. | | |
| 5,561,826 A | 10/1996 | Davies et al. | | |
| 5,592,632 A | 1/1997 | Leung et al. | ................ | 395/306 |
| 5,594,925 A | 1/1997 | Harder et al. | | |
| 5,611,055 A | 3/1997 | Krishan et al. | ............... | 395/281 |
| 5,613,077 A | 3/1997 | Leung et al. | ................ | 395/306 |
| 5,627,963 A | 5/1997 | Gabillard et al. | ............. | 714/42 |
| 5,629,685 A | 5/1997 | Allen et al. | ............ | 340/825.02 |
| 5,661,677 A | 8/1997 | Rondeau, II et al. | .......... | 365/63 |
| 5,666,480 A | 9/1997 | Leung et al. | ............... | 395/180 |
| 5,684,418 A | 11/1997 | Yanagiuchi | | |
| 5,706,346 A | 1/1998 | Katta et al. | | |
| 5,737,589 A | 4/1998 | Doi et al. | | |
| 5,754,804 A | 5/1998 | Cheselka et al. | | |
| 5,764,155 A | 6/1998 | Kertesz et al. | ......... | 340/825.08 |
| 5,822,749 A | 10/1998 | Agarwal | ....................... | 707/2 |
| 5,852,617 A | 12/1998 | Mote, Jr. | .................... | 714/726 |
| 5,870,320 A | 2/1999 | Volkonsky | | |
| 5,870,325 A | 2/1999 | Nielsen et al. | ................ | 365/63 |
| 5,872,996 A | 2/1999 | Barth et al. | ................. | 395/853 |
| 5,881,154 A | 3/1999 | Nohara et al. | | |
| 5,917,760 A | 6/1999 | Millar | | |
| 5,926,838 A | 7/1999 | Jeddeloh | ..................... | 711/167 |
| 5,928,343 A | 7/1999 | Farmwald et al. | ............. | 710/104 |
| 5,930,273 A | 7/1999 | Mukojima | ................... | 714/776 |
| 5,959,914 A | 9/1999 | Gates et al. | | |
| 5,973,951 A | 10/1999 | Bechtolsheim et al. | ......... | 365/52 |
| 5,974,493 A | 10/1999 | Okumura et al. | ............ | 710/307 |
| 5,995,405 A | 11/1999 | Trick | ............................ | 365/63 |
| 6,003,121 A | 12/1999 | Wirt | | |
| 6,011,732 A | 1/2000 | Harrison et al. | | |
| 6,038,132 A | 3/2000 | Tokunaga et al. | ............. | 361/760 |
| 6,049,476 A | 4/2000 | Laudon et al. | ................ | 365/52 |
| 6,076,158 A | 6/2000 | Sites et al. | .................... | 712/230 |
| 6,078,515 A | 6/2000 | Nielsen et al. | ................ | 365/63 |
| 6,081,868 A | 6/2000 | Brooks | | |
| 6,085,276 A | 7/2000 | Vandoren et al. | | |
| 6,088,817 A | 7/2000 | Haulin | | |
| 6,096,091 A | 8/2000 | Hartmann | .................... | 716/17 |
| 6,128,746 A | 10/2000 | Clark et al. | ................. | 713/324 |
| 6,145,028 A | 11/2000 | Shank et al. | | |
| 6,158,040 A | 12/2000 | Ho | | |
| 6,170,047 B1 | 1/2001 | Dye | ............................ | 711/170 |
| 6,170,059 B1 | 1/2001 | Pruett et al. | ................. | 713/200 |
| 6,173,382 B1 | 1/2001 | Dell et al. | ..................... | 711/170 |
| 6,185,718 B1 | 2/2001 | Dell et al. | | |
| 6,198,304 B1 | 3/2001 | Sasaki | | |
| 6,215,686 B1 | 4/2001 | Deneroff et al. | ............... | 365/52 |
| 6,216,247 B1 | 4/2001 | Creta et al. | | |
| 6,219,288 B1 | 4/2001 | Braceras et al. | | |
| 6,219,760 B1 | 4/2001 | McMinn | | |
| 6,233,639 B1 | 5/2001 | Dell et al. | | |
| 6,260,127 B1 | 7/2001 | Olarig et al. | ................. | 711/167 |
| 6,262,493 B1 | 7/2001 | Garnett | | |
| 6,285,172 B1 | 9/2001 | Torbey | | |
| 6,292,903 B1 | 9/2001 | Coteus et al. | ............... | 713/401 |
| 6,301,636 B1 | 10/2001 | Schultz et al. | ............... | 711/108 |
| 6,308,247 B1 | 10/2001 | Ackerman et al. | | |
| 6,317,352 B1 | 11/2001 | Halbert et al. | ................ | 365/52 |
| 6,321,343 B1 | 11/2001 | Toda | ........................ | 713/600 |
| 6,338,113 B1 | 1/2002 | Kubo et al. | ................. | 711/105 |
| 6,349,390 B1 | 2/2002 | Dell et al. | | |
| 6,357,018 B1 | 3/2002 | Stuewe et al. | | |
| 6,370,631 B1 | 4/2002 | Dye | ............................ | 711/170 |
| 6,378,018 B1 | 4/2002 | Tsern et al. | ................. | 710/129 |
| 6,381,685 B2 | 4/2002 | Dell et al. | | |
| 6,393,512 B1* | 5/2002 | Chen et al. | ....................... | 711/5 |
| 6,393,528 B1 | 5/2002 | Arimilli et al. | .............. | 711/137 |
| 6,408,398 B1 | 6/2002 | Frecker et al. | | |
| 6,425,044 B1* | 7/2002 | Jeddeloh | ......................... | 711/5 |
| 6,446,174 B1 | 9/2002 | Dow | | |
| 6,446,224 B1 | 9/2002 | Chang et al. | | |
| 6,461,013 B1 | 10/2002 | Simon | | |
| 6,467,013 B1 | 10/2002 | Nizar | | |
| 6,473,836 B1 | 10/2002 | Ikeda | ........................ | 711/137 |
| 6,477,614 B1 | 11/2002 | Leddige et al. | | |
| 6,477,615 B1 | 11/2002 | Tanaka | | |
| 6,483,755 B2 | 11/2002 | Leung et al. | ........... | 365/189.05 |
| 6,484,271 B1 | 11/2002 | Gray | | |
| 6,487,102 B1 | 11/2002 | Halbert et al. | | |
| 6,487,627 B1 | 11/2002 | Willke et al. | ................. | 710/306 |
| 6,493,250 B2 | 12/2002 | Halbert et al. | ................ | 365/63 |
| 6,496,540 B1 | 12/2002 | Widmer | ...................... | 375/242 |
| 6,496,910 B1 | 12/2002 | Baentsch et al. | ............. | 711/165 |
| 6,499,070 B1 | 12/2002 | Whetsel | | |
| 6,502,161 B1 | 12/2002 | Perego et al. | .................. | 711/5 |
| 6,505,305 B1 | 1/2003 | Olarig | | |
| 6,507,888 B2 | 1/2003 | Wu et al. | .................... | 711/105 |
| 6,510,100 B2 | 1/2003 | Grundon et al. | ............. | 365/233 |
| 6,513,091 B1 | 1/2003 | Blackmon et al. | ............. | 710/316 |
| 6,526,469 B1 | 2/2003 | Drehmel et al. | | |
| 6,530,007 B2 | 3/2003 | Olarig | | |
| 6,532,525 B1 | 3/2003 | Aleksic et al. | .............. | 711/168 |
| 6,546,359 B1 | 4/2003 | Week | ........................ | 702/186 |
| 6,549,971 B1 | 4/2003 | Cecchi et al. | ................ | 710/306 |
| 6,553,450 B1 | 4/2003 | Dodd et al. | ................. | 711/105 |
| 6,557,069 B1 | 4/2003 | Drehmel et al. | ............. | 710/307 |
| 6,564,329 B1 | 5/2003 | Cheung et al. | ............... | 713/322 |
| 6,584,576 B1 | 6/2003 | Co | | |
| 6,587,912 B2 | 7/2003 | Leddige | | |
| 6,590,827 B2 | 7/2003 | Chang et al. | | |
| 6,594,713 B1 | 7/2003 | Fuoco et al. | | |
| 6,594,748 B1 | 7/2003 | Lin | | |
| 6,601,121 B2 | 7/2003 | Singh et al. | ................. | 710/112 |
| 6,601,149 B1 | 7/2003 | Brock et al. | | |
| 6,604,180 B2 | 8/2003 | Jeddeloh | | |
| 6,611,905 B1 | 8/2003 | Grundon et al. | | |
| 6,622,217 B2 | 9/2003 | Gharachorloo et al. | ....... | 711/141 |
| 6,622,227 B2 | 9/2003 | Zumkehr et al. | | |
| 6,625,687 B1 | 9/2003 | Halber et al. | ................ | 711/105 |
| 6,625,702 B2 | 9/2003 | Rentscler et al. | | |
| 6,628,538 B2 | 9/2003 | Funaba et al. | ................. | 365/63 |
| 6,631,439 B2 | 10/2003 | Saulsbury et al. | | |
| 6,636,957 B2 | 10/2003 | Stevens et al. | | |
| 6,643,745 B1 | 11/2003 | Palanca et al. | | |
| 6,671,376 B1 | 12/2003 | Koto et al. | .................. | 380/210 |
| 6,678,811 B2 | 1/2004 | Rentschler et al. | .......... | 711/167 |
| 6,681,292 B2 | 1/2004 | Creta et al. | | |
| 6,684,320 B2 | 1/2004 | Mohamed et al. | | |

| Patent No. | Date | Name | Ref |
|---|---|---|---|
| 6,697,919 B2 | 2/2004 | Gharachorloo et al. | 711/141 |
| 6,704,842 B1 | 3/2004 | Janakiraman et al. | |
| 6,721,185 B1 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,799,241 B2 | 9/2004 | Kahn et al. | |
| 6,807,650 B2 | 10/2004 | Lamb et al. | |
| 6,832,329 B2 | 12/2004 | Ahrens et al. | |
| 6,839,393 B1 | 1/2005 | Sidiropoulos | 375/371 |
| 6,845,472 B2 | 1/2005 | Walker et al. | |
| 6,847,583 B2 | 1/2005 | Janzen et al. | |
| 6,851,036 B1 | 2/2005 | Toda et al. | |
| 6,874,102 B2 | 3/2005 | Doody et al. | |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,898,726 B1 | 5/2005 | Lee | |
| 6,910,146 B2 | 6/2005 | Dow | |
| 6,918,068 B2 | 7/2005 | Vail et al. | |
| 6,925,534 B2 | 8/2005 | David | |
| 6,938,119 B2 | 8/2005 | Kohn et al. | |
| 6,944,084 B2 | 9/2005 | Wilcox | |
| 6,948,091 B2 | 9/2005 | Bartels et al. | |
| 6,949,950 B2 | 9/2005 | Takahashi et al. | |
| 6,952,761 B2 | 10/2005 | John | |
| 6,965,952 B2 | 11/2005 | Echartea et al. | |
| 6,977,536 B2 | 12/2005 | Chin-Chieh et al. | 327/116 |
| 6,977,979 B1 | 12/2005 | Hartwell et al. | |
| 6,993,612 B2 | 1/2006 | Porterfield | |
| 6,996,639 B2 | 2/2006 | Narad | |
| 6,996,766 B2 | 2/2006 | Cypher | |
| 7,039,755 B1 | 5/2006 | Helms | |
| 7,047,370 B1 | 5/2006 | Jeter, Jr. et al. | |
| 7,047,371 B2 * | 5/2006 | Dortu | 711/154 |
| 7,047,373 B2 | 5/2006 | Kim | |
| 7,047,384 B2 | 5/2006 | Bodas et al. | |
| 7,051,172 B2 | 5/2006 | Mastronarde et al. | |
| 7,076,700 B2 | 7/2006 | Rieger | |
| 7,091,890 B1 | 8/2006 | Sasaki et al. | |
| 7,103,792 B2 | 9/2006 | Moon | |
| 7,120,743 B2 * | 10/2006 | Meyer et al. | 711/118 |
| 7,133,790 B2 | 11/2006 | Liou | |
| 7,133,972 B2 | 11/2006 | Jeddeloh | |
| 7,155,016 B1 | 12/2006 | Betts et al. | |
| 7,162,567 B2 * | 1/2007 | Jeddeloh | 711/5 |
| 7,177,211 B2 | 2/2007 | Zimmerman | |
| 7,194,593 B2 | 3/2007 | Schnepper | |
| 7,197,594 B2 | 3/2007 | Raz et al. | |
| 7,197,670 B2 | 3/2007 | Boatright et al. | |
| 7,203,318 B2 | 4/2007 | Collum et al. | |
| 7,206,887 B2 | 4/2007 | Jeddeloh | |
| 7,206,962 B2 | 4/2007 | Deegan | |
| 7,210,059 B2 * | 4/2007 | Jeddeloh | 714/5 |
| 7,216,196 B2 * | 5/2007 | Jeddeloh | 711/5 |
| 7,216,276 B1 | 5/2007 | Azimi et al. | |
| 7,222,213 B2 | 5/2007 | James | |
| 7,227,949 B2 | 6/2007 | Heegard et al. | |
| 7,240,145 B2 | 7/2007 | Holman | |
| 7,260,685 B2 * | 8/2007 | Lee et al. | 711/137 |
| 7,266,634 B2 | 9/2007 | Ware et al. | |
| 7,269,765 B1 | 9/2007 | Charlton et al. | |
| 7,296,129 B2 | 11/2007 | Gower et al. | |
| 7,313,583 B2 | 12/2007 | Porten et al. | |
| 7,319,340 B2 | 1/2008 | Jeddeloh et al. | |
| 7,321,979 B2 | 1/2008 | Lee | |
| 7,334,159 B1 | 2/2008 | Callaghan | |
| 7,353,316 B2 * | 4/2008 | Erdmann | 710/316 |
| 7,363,419 B2 * | 4/2008 | Cronin et al. | 711/5 |
| 7,363,436 B1 * | 4/2008 | Yeh et al. | 711/149 |
| 7,370,134 B2 | 5/2008 | Jeddeloh | |
| 7,376,146 B2 | 5/2008 | Beverly et al. | |
| 7,386,575 B2 | 6/2008 | Bashant et al. | |
| 7,386,771 B2 | 6/2008 | Shuma | |
| 7,404,118 B1 | 7/2008 | Baguette et al. | |
| 7,418,526 B2 | 8/2008 | Jeddeloh | |
| 7,421,525 B2 | 9/2008 | Polzin et al. | |
| 7,430,145 B2 | 9/2008 | Weiss et al. | |
| 7,433,258 B2 | 10/2008 | Rao et al. | |
| 2001/0000822 A1 | 5/2001 | Dell et al. | 711/170 |
| 2001/0003839 A1 | 6/2001 | Kondo | 711/144 |
| 2001/0029566 A1 | 10/2001 | Shin | |
| 2001/0029592 A1 | 10/2001 | Walker et al. | |
| 2002/0019926 A1 | 2/2002 | Huppenthal et al. | 712/15 |
| 2002/0038405 A1 | 3/2002 | Leddige et al. | 711/115 |
| 2002/0059439 A1 | 5/2002 | Arroyo et al. | |
| 2002/0083255 A1 | 6/2002 | Greeff et al. | 710/305 |
| 2002/0103988 A1 | 8/2002 | Dornier | 712/38 |
| 2002/0112119 A1 | 8/2002 | Halbert et al. | 711/115 |
| 2002/0112194 A1 | 8/2002 | Uzelac | 713/500 |
| 2002/0124195 A1 | 9/2002 | Nizar | 713/320 |
| 2002/0124201 A1 | 9/2002 | Edwards et al. | |
| 2002/0147898 A1 | 10/2002 | Rentschler et al. | 711/170 |
| 2002/0174274 A1 | 11/2002 | Wu et al. | 710/100 |
| 2003/0009632 A1 | 1/2003 | Arimilli et al. | |
| 2003/0028701 A1 | 2/2003 | Rao et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayashi | |
| 2003/0084309 A1 | 5/2003 | Kohn | 713/189 |
| 2003/0090879 A1 | 5/2003 | Doblar et al. | 361/728 |
| 2003/0105938 A1 | 6/2003 | Cooksey et al. | |
| 2003/0118044 A1 | 6/2003 | Blanc et al. | |
| 2003/0126354 A1 | 7/2003 | Kahn et al. | |
| 2003/0126363 A1 | 7/2003 | David | |
| 2003/0223303 A1 | 12/2003 | Lamb et al. | 365/230.06 |
| 2003/0229770 A1 | 12/2003 | Jeddeloh | |
| 2003/0235222 A1 | 12/2003 | Bridges et al. | |
| 2003/0236959 A1 | 12/2003 | Johnson et al. | 711/167 |
| 2004/0006674 A1 | 1/2004 | Hargis et al. | 711/156 |
| 2004/0015650 A1 | 1/2004 | Zumkehr et al. | |
| 2004/0049723 A1 | 3/2004 | Obara | 714/729 |
| 2004/0078615 A1 | 4/2004 | Martin et al. | |
| 2004/0098546 A1 | 5/2004 | Bashant et al. | |
| 2004/0098549 A1 | 5/2004 | Dorst | |
| 2004/0117588 A1 | 6/2004 | Arimilli et al. | 711/203 |
| 2004/0123222 A1 | 6/2004 | Widmer | |
| 2004/0128474 A1 | 7/2004 | Vorbach | 712/10 |
| 2004/0148482 A1 | 7/2004 | Grundy et al. | |
| 2004/0160832 A1 | 8/2004 | Janzen et al. | |
| 2004/0163028 A1 | 8/2004 | Olarig | |
| 2004/0165609 A1 | 8/2004 | Herbst et al. | |
| 2004/0199363 A1 | 10/2004 | Bohizic et al. | |
| 2004/0205433 A1 | 10/2004 | Gower et al. | |
| 2004/0230718 A1 | 11/2004 | Polzin et al. | 710/22 |
| 2004/0246767 A1 | 12/2004 | Vogt | 365/154 |
| 2004/0250153 A1 | 12/2004 | Vogt | 713/500 |
| 2004/0260909 A1 | 12/2004 | Lee et al. | 711/213 |
| 2004/0260957 A1 | 12/2004 | Jeddeloh et al. | |
| 2005/0022065 A1 | 1/2005 | Dixon et al. | |
| 2005/0023560 A1 | 2/2005 | Ahn et al. | 257/200 |
| 2005/0027941 A1 | 2/2005 | Wang et al. | |
| 2005/0044305 A1 | 2/2005 | Jakobs et al. | |
| 2005/0050237 A1 | 3/2005 | Jeddeloh et al. | 710/10 |
| 2005/0050255 A1 | 3/2005 | Jeddeloh | 710/317 |
| 2005/0066136 A1 | 3/2005 | Schnepper | 711/154 |
| 2005/0071542 A1 | 3/2005 | Weber et al. | |
| 2005/0071707 A1 | 3/2005 | Hampel | |
| 2005/0078506 A1 | 4/2005 | Rao et al. | |

| | | | |
|---|---|---|---|
| 2005/0080581 A1 | 4/2005 | Zimmerman et al. ......... 702/117 |
| 2005/0081085 A1 | 4/2005 | Ellis et al. |
| 2005/0081114 A1 | 4/2005 | Ackaret et al. |
| 2005/0081129 A1 | 4/2005 | Shah et al. |
| 2005/0086424 A1 | 4/2005 | Oh et al. |
| 2005/0086441 A1 | 4/2005 | Meyer et al. |
| 2005/0097249 A1 | 5/2005 | Oberlin et al. |
| 2005/0105350 A1 | 5/2005 | Zimmerman et al. |
| 2005/0120157 A1 | 6/2005 | Chen et al. ................. 710/313 |
| 2005/0125702 A1 | 6/2005 | Huang et al. |
| 2005/0125703 A1 | 6/2005 | Lefurgy et al. |
| 2005/0138246 A1 | 6/2005 | Chen et al. |
| 2005/0138267 A1 | 6/2005 | Bains et al. |
| 2005/0144399 A1 | 6/2005 | Hosomi ...................... 711/145 |
| 2005/0149665 A1 | 7/2005 | Wolrich et al. |
| 2005/0166006 A1 | 7/2005 | Talbot et al. |
| 2005/0177677 A1 | 8/2005 | Jeddeloh |
| 2005/0177690 A1 | 8/2005 | LaBerge ..................... 711/154 |
| 2005/0204216 A1 | 9/2005 | Daily et al. ................ 714/724 |
| 2005/0216678 A1 | 9/2005 | Jeddeloh |
| 2005/0220097 A1 | 10/2005 | Swami et al. |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh |
| 2005/0259496 A1 | 11/2005 | Hsu et al. ................... 365/226 |
| 2005/0289292 A1 | 12/2005 | Morrow et al. |
| 2005/0289377 A1 | 12/2005 | Luong |
| 2006/0004953 A1 | 1/2006 | Vogt |
| 2006/0010339 A1 | 1/2006 | Klein |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0104371 A1 | 5/2006 | Schuermans et al. |
| 2006/0107175 A1 | 5/2006 | Dell et al. |
| 2006/0112238 A1 | 5/2006 | Jamil et al. |
| 2006/0161733 A1 | 7/2006 | Beckett et al. |
| 2006/0162882 A1 | 7/2006 | Ohara et al. |
| 2006/0168407 A1 | 7/2006 | Stern |
| 2006/0179208 A1 | 8/2006 | Jeddeloh |
| 2006/0190674 A1 | 8/2006 | Poechmueller |
| 2006/0195631 A1 | 8/2006 | Rajamani |
| 2006/0206742 A1 | 9/2006 | James |
| 2006/0212666 A1 | 9/2006 | Jeddeloh |
| 2006/0224764 A1 | 10/2006 | Shinohara et al. |
| 2006/0277365 A1 | 12/2006 | Pong |
| 2006/0288172 A1 | 12/2006 | Lee et al. |
| 2007/0005922 A1 | 1/2007 | Swaminathan et al. |
| 2007/0025304 A1 | 2/2007 | Leelahakriengkrai et al. |
| 2007/0038907 A1 | 2/2007 | Jeddeloh et al. |
| 2007/0067382 A1 | 3/2007 | Sun |
| 2007/0083701 A1 | 4/2007 | Kapil |
| 2007/0160053 A1 | 7/2007 | Coteus et al. |
| 2008/0043808 A1 | 2/2008 | Hsu et al. |
| 2008/0162807 A1 | 7/2008 | Rothman et al. |
| 2008/0163014 A1 | 7/2008 | Crawford et al. |
| 2008/0222379 A1 | 9/2008 | Jeddeloh |
| 2009/0006900 A1 | 1/2009 | Lastras-Montano et al. |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0004481 A2 | 1/2000 |
| WO | 0223353 A2 | 3/2002 |
| WO | WO2005038660 | 4/2005 |
| WO | 2007109888 | 10/2007 |

OTHER PUBLICATIONS

PCT International Search Report PCT/EP2007/057916. Mailed Dec. 14, 2007.

Luca Benini, et al., "System-Level Powers Optimization: Techniques and Tools", ACM Transactions on Design Automation of Electronic Systems, vol. 5, No. 2, Apr. 2000, pp. 115-192.

Boudon, et al., "Novel Bus Reconfiguration Scheme With Spare Lines", IBM Technical Disclosure Bulletin, May 1987, vol. 29, No. 12, pp. 1-3.

Brown, et al "Compiler-Based I/O Prefetching for Out-of-Core Applications", ACM Transactions on Computer Systems, vol. 19, No. 2, May 2001, pp. 111-170.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

JEDEC Solid State Technology Association, "JEDEC Standard: DDR2 SDRAM Specification", Jan. 2004, JEDEC, Revision JESD79-2A, p. 10.

Jungjoon Kim et al.; "Performance and Architecture Features of Segmented Multiple Bus System;" IEEE Computer Society; 1999 International Conference on Parallel Processing (ICPP '99).

Massoud Pedram, "Power Minimization in IC Design Principles and Applications", ACM Transactions on Design Automation of Electronic Systems vol. 1, No. 1, Jan. 1996, pp. 3-56.

Natarajan, et al., "A Study of Performance Impact of Memory Controller Features in Multi-Processor Server Environment", pp. 80-87.

NB940259 (IBM Technical Disclosure Bulletin, Feb. 1994; vol. 37; pp. 59-64).

Nilsen, "High-Level Dynamic Memory Management for Object-Oriented Real-Time Systems", pp. 86-93.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction.Org, pp. 1-5, http://www.directron.com/directron/fsbguide.html. [online]; [retrieved on Feb. 23, 2006]; retrieved from the Internet.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

U.S. Appl. No. 11/419,586, filed May 22, 2006. Robert Tremaine. "Systems and Methods for Providing Remote Pre-Fetch Buffers".

Wang, et al., "Guided Region Prefetching: A Cooperative Hardware/Software Approach", pp. 388-398.

Wikipedia, Serial Communications, [online], [retrieved Apr. 10, 2007 from the Internet], http://en.wikipedia.org/wiki/Serial_communications, 3 pages.

International Search Report, International Application No. PCT/EP2007/054929, International Publication No. WO 2007/135144 A1, received Mar. 21, 2008.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT Search Report. PCT/EP2007/057915. Mailed Nov. 7, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

IBM. IBM WebSphere Enterprise Service Bus. Version 6.0.2 2006 (165-0071-USC NOA Jun. 12, 2009).

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).

Oracle. Oracle Enterprise Service Bus. Oracle Data Sheet. Oct. 2006 (165-0071-USC NOA Jun. 12, 2009).

* cited by examiner

FIG. 12

SYSTEMS AND METHODS FOR PROVIDING COLLISION DETECTION IN A MEMORY SYSTEM

BACKGROUND OF THE INVENTION

This invention relates generally to computer memory, and more particularly to providing collision detection in a memory system.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 depicts a contemporary system composed of an integrated processor chip 500, which contains one or more processor elements and an integrated memory controller 510. In the configuration depicted in FIG. 5, multiple independent cascade interconnected memory interface busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnect memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a memory structure with cascaded memory modules 503 and unidirectional busses 506. One of the functions provided by the hub devices 504 in the memory modules 503 in the cascade structure is a re-drive function to send signals on the unidirectional busses 506 to other memory modules 503 or to the memory controller 510. FIG. 6 includes the memory controller 510 and four memory modules 503, on each of two memory busses 506 (a downstream memory bus with 24 wires and an upstream memory bus with 25 wires), connected to the memory controller 510 in either a direct or cascaded manner. The memory module 503 next to the memory controller 510 is connected to the memory controller 510 in a direct manner. The other memory modules 503 are connected to the memory controller 510 in a cascaded manner. Although not shown in this figure, the memory controller 510 may be integrated in the processor 500 and may connect to more than one memory bus 506 as depicted in FIG. 5.

FIG. 7 depicts a block diagram of a memory hub device 504 including a link interface 704 for providing the means to re-synchronize, translate and re-drive high speed memory access information to associated DRAM devices 509 and/or to re-drive the information downstream on memory bus 506 as applicable based on the memory system protocol. The information is received by the link interface 704 from an upstream memory hub device 504 or from a memory controller 510 (directly or via an upstream memory hub device 504) via the memory bus 506. The memory device data interface 715 manages the technology-specific data interface with the memory devices 509 and controls the bi-directional memory data bus 708. The memory hub control 713 responds to access request packets by responsively driving the memory device 509 technology-specific address and control bus 714 (for memory devices in RANK0 501) or address and control bus 714' (for memory devices in RANK1 716) and directing the read data flow 707 and write data flow 710 selectors.

The link interface 704 in FIG. 7 decodes the packets and directs the address and command information directed to the local hub device 504 to the memory hub control 713. Memory write data from the link interface 704 can be temporarily stored in the write data queue 711 or directly driven to the memory devices 509 via the write data flow selector 710 and internal bus 712, and then sent via internal bus 709 and memory device data interface 715 to memory device data bus 708. Memory read data from memory device(s) 509 can be queued in the read data queue 706 or directly transferred to the link interface 704 via internal bus 705 and read data selector 707, to be transmitted on the upstream bus 506 as a read reply packet.

During the operation of a memory system, the memory controller is responsible for scheduling all memory accesses and other operations such that resource conflicts do not arise in memory system elements such as the interface bus(es), the interface logic (e.g., the hub device) and/or the memory devices themselves. At the same time, overall system performance optimization is best achieved by efficiently utilizing available resources by minimizing the idle and/or standby time associated with each of these system elements. Problems arise when the controller improperly schedules these resources, for example, by scheduling memory commands which will result in an invalid memory operation sequence or interface timing, by not allowing sufficient time for an interface bus to settle after an information transfer, and/or by scheduling a sequence of operations that result in excessive device temperature excursions. Each of these examples would likely result in a memory system failure, which may appear to the computer system and/or operator to be intermittent in nature given the difficulty in repeating the set of events that results in the failure. Further, it can be difficult to identify bus scheduling or resource conflicts easily because the continuing increase in bus data rates coupled with the adoption of point-to-point buses impede and/or prevent the use of external test equipment to "snoop" bus activity and thereby predict possible conflicts during system bring-up, stress testing, qualification, and in response to field failures.

Currently, verifying correct resource scheduling and/or correlating actual failures is often performed using system simulation to verify that the logic is behaving as expected under a specified configuration. A drawback of this approach is that chip sequences in hardware are very difficult to reproduce exactly. Another manner of identifying conflicts is to add delay cycles between commands to uncover resource scheduling issues manually. Drawbacks of this approach are that the addition of delay cycles is time consuming to debug and does not guarantee that the collision will be found and isolated in a reasonable time frame and may even result in new resource conflicts due to the new command sequences/intervals.

It would be desirable to have a memory subsystem that avoids the above drawbacks while monitoring operations such as memory accesses and reporting resource conflicts with adequate information to permit root cause analysis and determination of corrective actions.

BRIEF SUMMARY OF THE INVENTION

Embodiments include a memory system for storing and retrieving data for a processing system. The memory system includes resource scheduling conflict logic for monitoring one or more memory resources for detecting resource scheduling conflicts. The memory system also includes error reporting logic for generating an error signal in response to detecting a resource scheduling conflict at one or more of the memory resources.

Embodiments also include a memory hub device including resource scheduling conflict logic for monitoring one or more memory resources for detecting resource scheduling conflicts. The memory hub device also includes error reporting logic for generating an error signal in response to detecting a resource scheduling conflict at one or more of the memory resources.

Embodiments also include a memory system for storing and retrieving data for a processing system. The memory system includes a memory controller for receiving and responding to memory access requests, a plurality of memory devices, a memory bus in communication with the memory controller, and a memory hub device in communication with the memory bus. The memory hub device includes a memory interface for transferring data and control information between the memory hub device and the memory controller via the memory bus. The memory hub device also includes a memory device interface for communicating with the memory devices. The memory hub device further includes resource scheduling conflict logic for monitoring one or more of the memory devices, the memory bus, and the memory device interface for resource scheduling conflicts.

Further embodiments include a method for providing collision detection in a memory system. The method includes receiving a new memory command and determining memory resources associated with the new memory command. The new memory command is compared to current memory activity to determine if a resource scheduling conflicts exists at the memory resources associated with the new memory command. An error signal is generated in response to determining that a resource scheduling conflict exists.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 12 is a timing diagram that may be implemented by exemplary embodiments to perform collision detection.

DETAILED DESCRIPTION OF EXEMPLARY EMBODIMENTS

Figure 1:
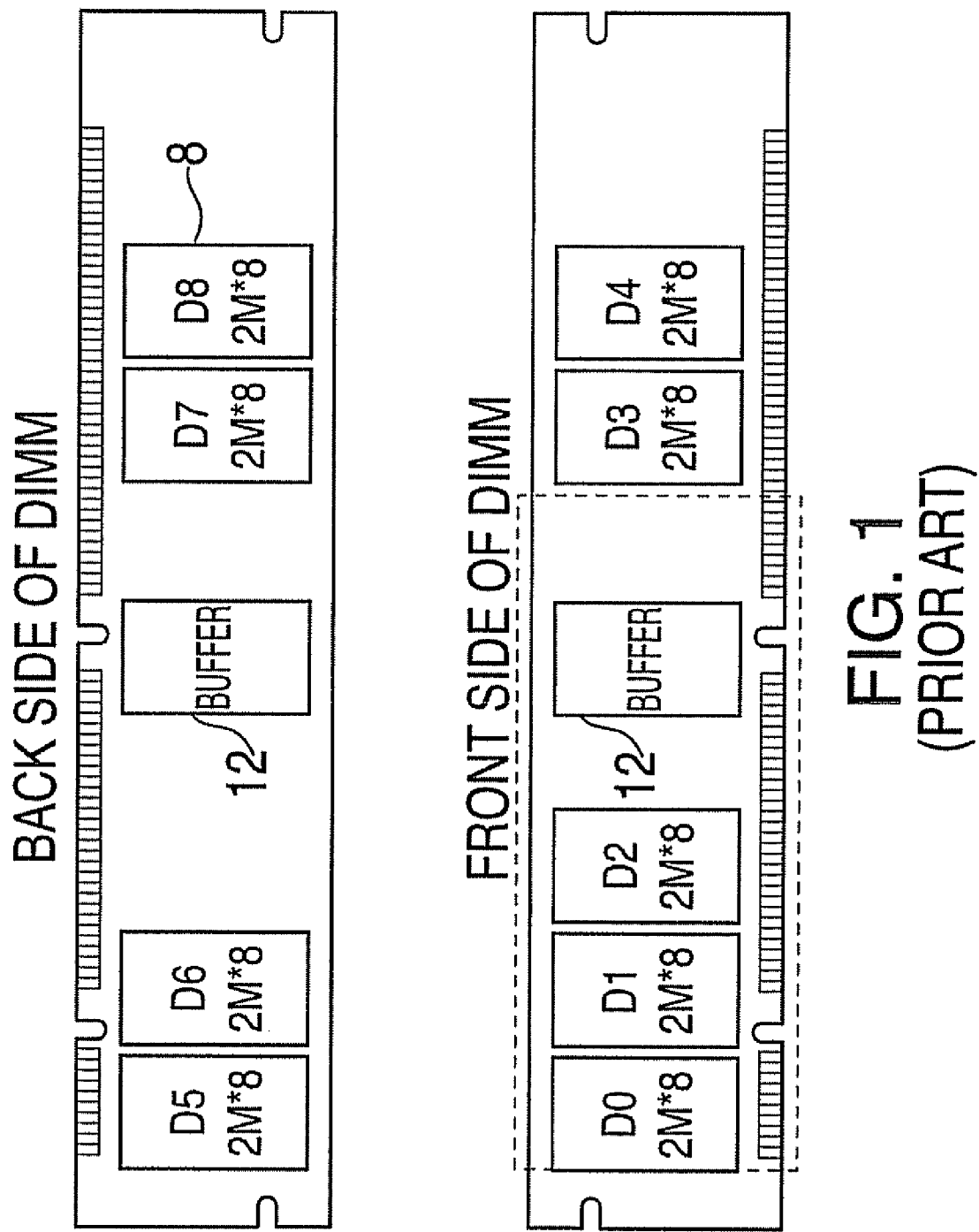
FIG. 1 depicts an exemplary early synchronous memory module.
Figure 2:
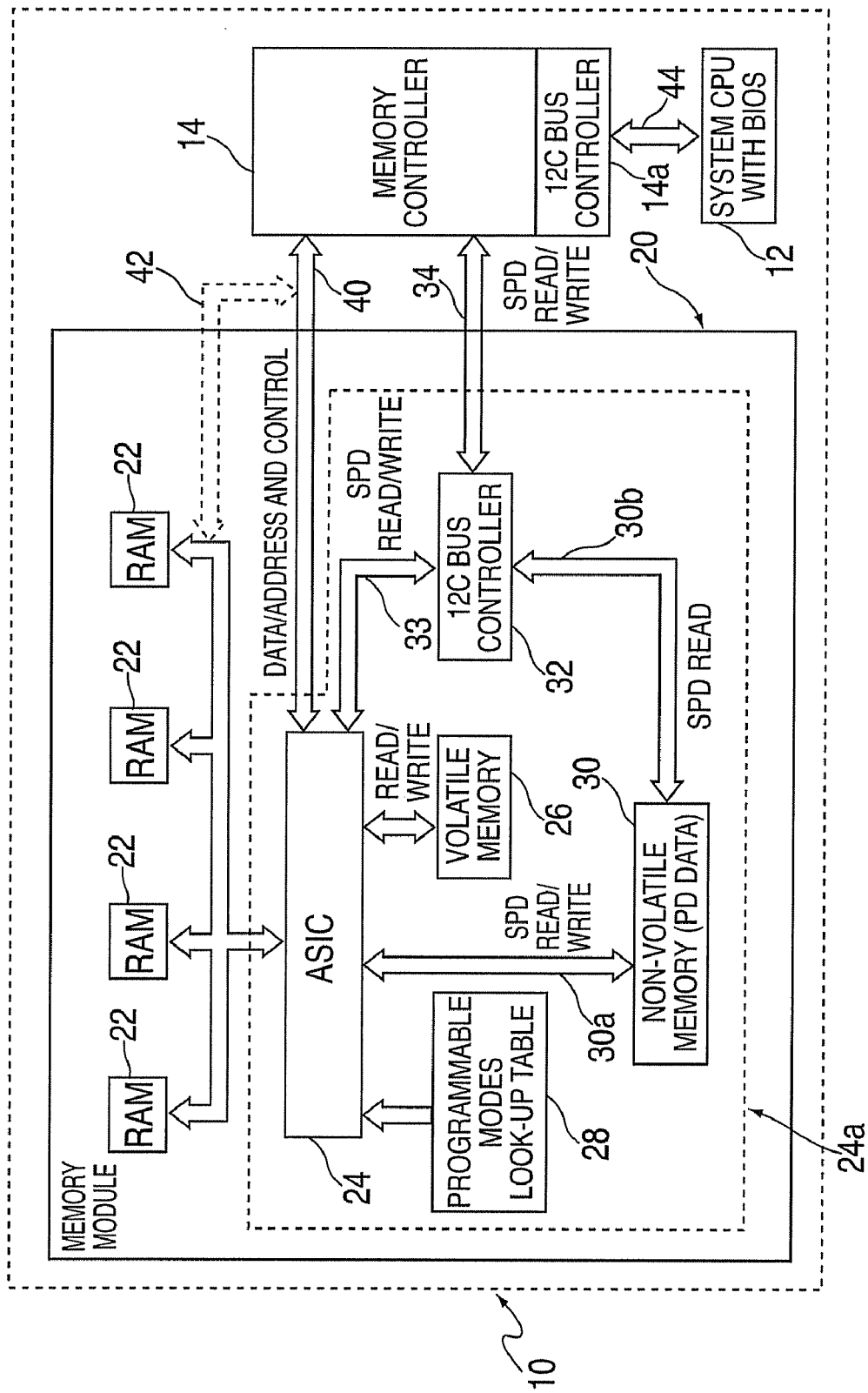
FIG. 2 depicts an exemplary computer system with a fully buffered synchronous memory module that is directly connected to a memory controller.
Figure 3:
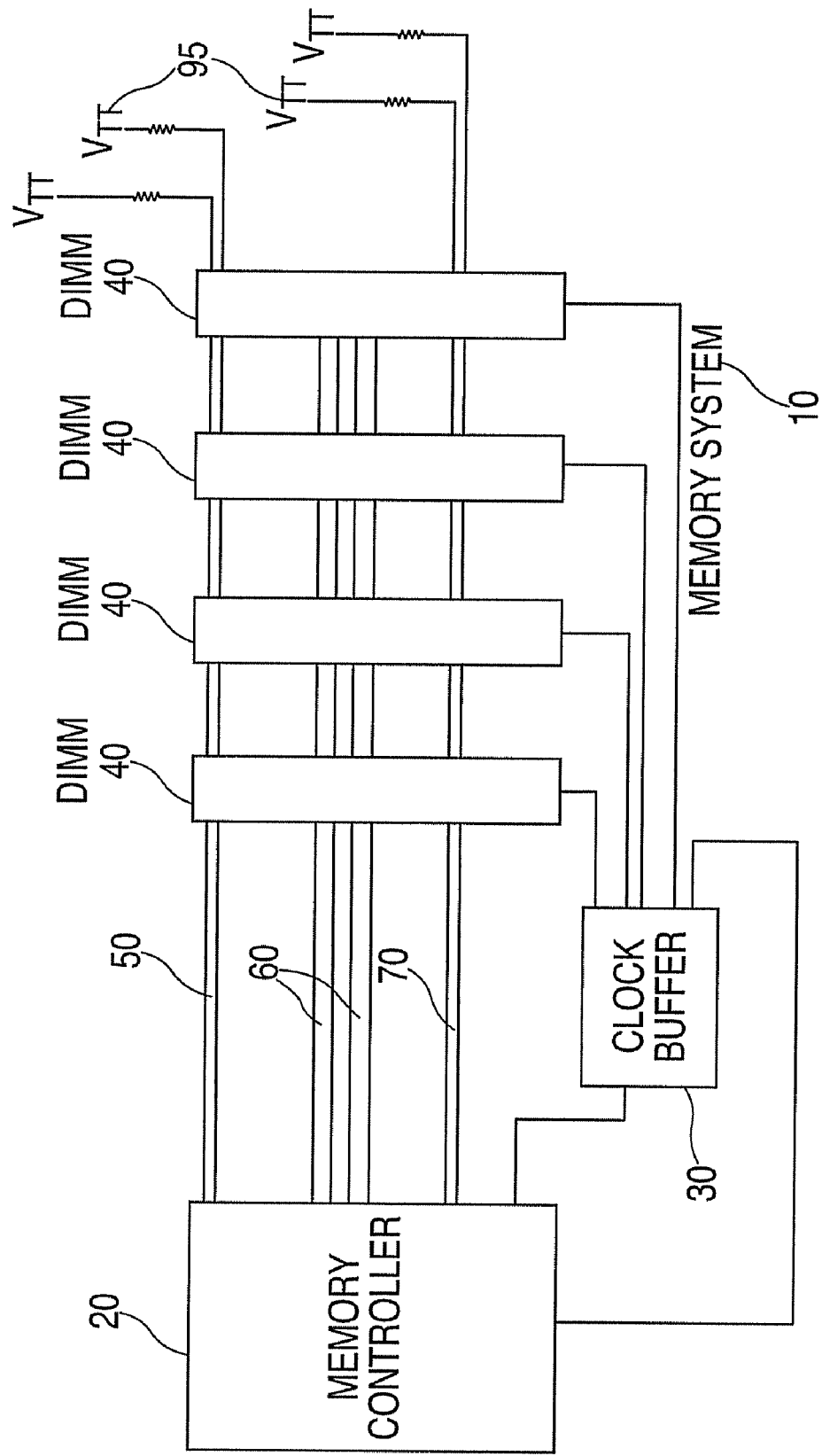
FIG. 3 depicts an exemplary memory system, shown with a single, traditional multi-drop stub bus.
Figure 4:
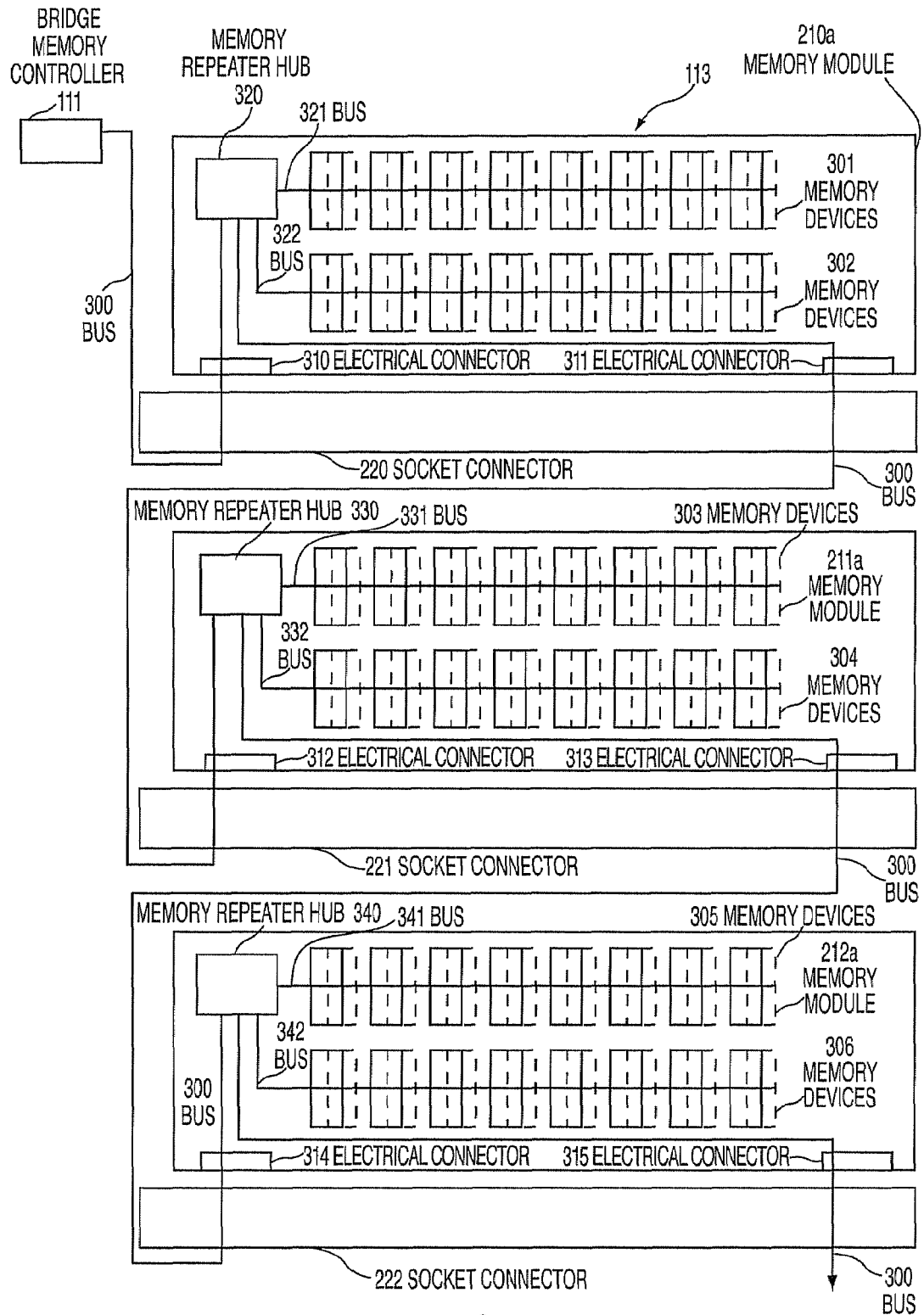
FIG. 4 depicts a fully buffered synchronous memory module and system structure, where the fully buffered synchronous memory module includes a repeater function.
Figure 5:
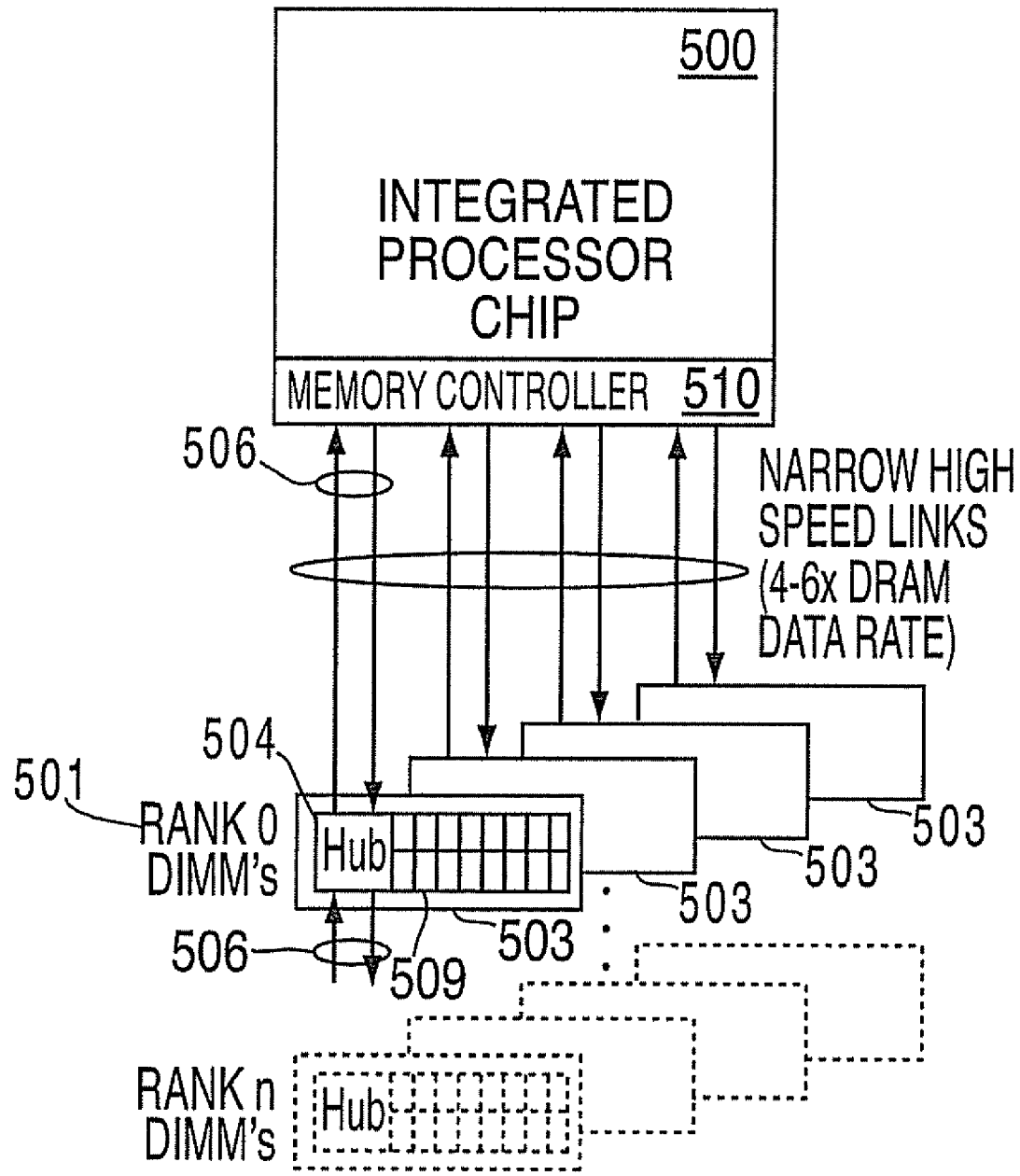
FIG. 5 depicts a block diagram of a computer memory system which includes multiple independent cascade interconnect memory interface busses that operate in unison to support a single data access request.
Figure 6:
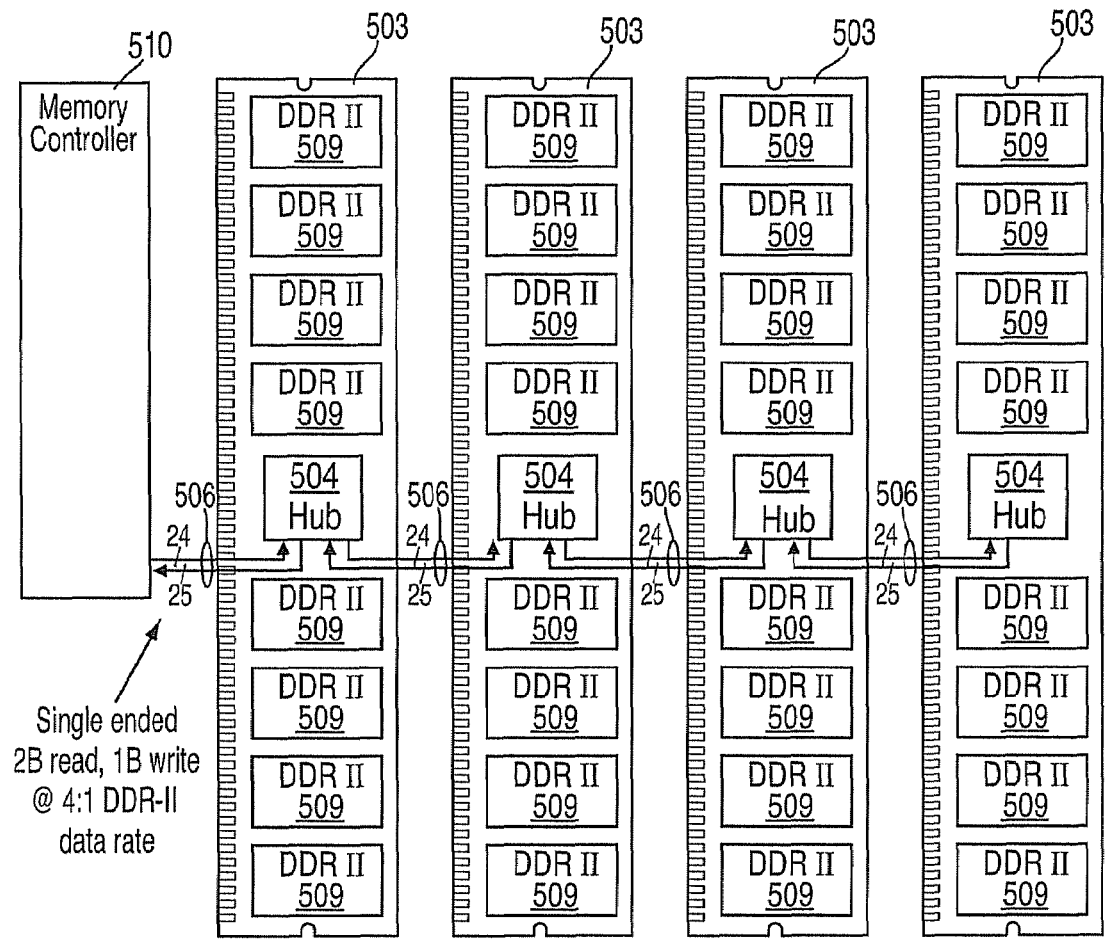
FIG. 6 depicts a memory structure with cascaded memory modules and unidirectional busses.

Exemplary embodiments utilize hardware collision detection and resource usage state machines to permit a memory subsystem to monitor operations, such as memory accesses, and to report resource scheduling conflicts with adequate information to permit root cause analysis and corrective actions to be determined. The types of resources, or memory resources, that can be monitored include, but are not limited to: downstream memory channel (i.e., information passing away from the controller); upstream memory channel (i.e., information passing toward the controller); memory device internal state; memory device (internal) bank usage; DIMM rank usage; DIMM memory command bus; and DIMM memory data bus.

Exemplary embodiments include dedicated finite state machines (FSMs) that monitor the state of the memory devices, module operations and system buses. Memory subsystem-level collision detection logic "snoops" the downstream memory channel, decodes the stream of commands, keeps track of the state of the memory devices in each memory rank, and tracks the resources being utilized within the memory subsystem as well as on the interface bus to the controller. When new memory commands are issued to the memory channel, the collision detection logic determines if the command would cause a resource scheduling conflict if issued in the manner requested by the memory controller. Upon receipt of the command, the command is recorded and the resource and the affected state FSMs are updated to reflect the operation. In this manner, the new memory command is compared to current memory activity to determine if a resource scheduling conflict exists at the memory resources associated with the new memory command. If the command does cause a conflict, an error condition is set and, optionally, an error signal, or system fault alert, is generated and/or the illegal operation is inhibited to prevent data corruption.

As used herein, the term "resource", or "memory resource", refers to any consumable unit in the memory system. A memory resource is anything that cannot be used by more than one requester at the same time (e.g., a downstream memory channel, a memory device command bus). As used herein, the term "resource conflict", or "resource scheduling conflict", refers to the time when a resource is requested to be used by more than one requester at a time. As used herein, the term "resource set" refers to a group of common resources that are differentiated by the address of the resource. The common resources comprising a "resource set" are directly engaged, for at least a portion of time, in the completion of the operations associated with the received command. Any given "resource" may be included in more than one "resource set"—as many resources are shared within the memory subsystem. An example of a resource set associated with a read from one bank in one rank of memory would include resources such as the memory device address and control bus 714, the memory device data bus 708, the selected memory rank 501 716, the selected memory devices 509, and that portion of the selected memory devices (e.g. at least the selected bank and common internal memory circuitry) as described in the memory device specification. Although the memory device banks will generally offer the same functionality, the use of common circuitry in the memory devices 509 do not permit certain commands to be executed concurrently. In addition, the use of common interface pins on the memory devices, as well as common busses, will not permit certain commands to different memory ranks to be executed concurrently. The memory "resource sets" provide the means by which all memory operations are logically described and command execution tracked such that any resource conflicts can be independently identified and reported. As used herein, the term "resource start time" refers to the amount of time delay (in clock cycles) from the receipt of a decoded input command to the time at which the resource will start to be utilized. The term "resource reserve time", as used herein, refers to the amount of time (in clock cycles) that the resource is going to be used for the execution of the decoded input command.

Figure 8:
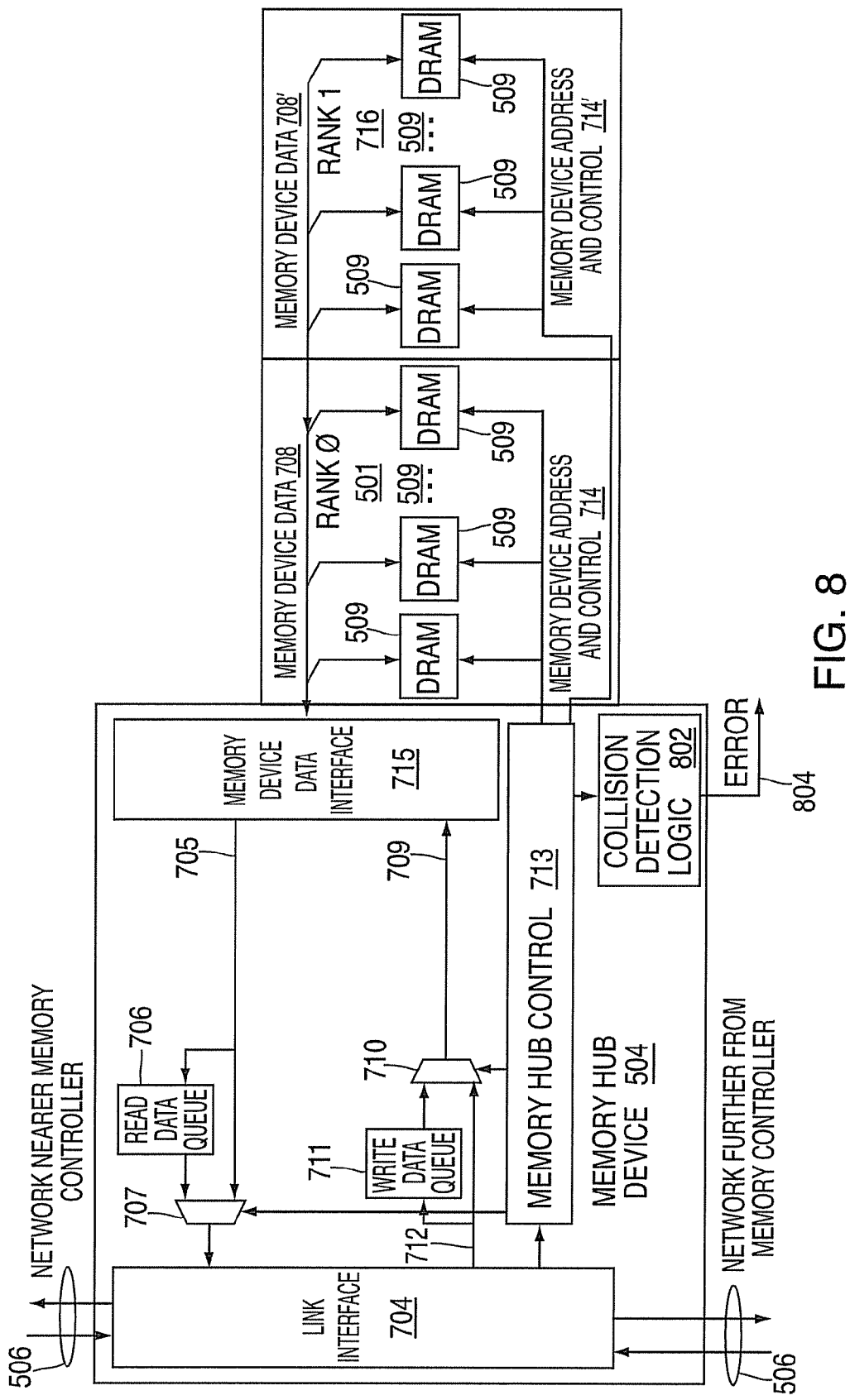
FIG. 8 is a block diagram of an exemplary hub device including collision detection logic that may be implemented by exemplary embodiments.

FIG. 8 is a block diagram of an exemplary hub device 504 including collision detection logic 802 that may be implemented by exemplary embodiments. In exemplary embodiments, the collision detection logic 802 includes trace array logic to implement a trace array. As used herein, the term "trace array" refers to an array of storage elements used to capture bus activity inside computer chips. The bus that is being traced is sampled every clock cycle, with the bus contents related to a given clock cycle stored in the array of storage elements. The trace array has configurable mechanisms to start and stop the trace, and may include mechanisms to compress the traced data. A trace array is generally used for debugging system hardware. In exemplary embodiments, the trace array is programmed to sample the input address and command stream (e.g. using a FIFO) and constantly record one or more of the input address and command stream until an error condition (e.g., a collision) is detected by the collision detection logic 802. When an error condition is detected, a stop trace signal is sent to the trace array to end the recording of the bus (i.e., to stop the trace array from further recording). In this manner, the input command stream captured in the trace array will document the input commands prior to and/or at the exact time of the error condition. This can be useful in analyzing traces to find the cause of certain system performance anomalies, and helps the designer and test engineer to understand the mechanisms that are causing error conditions because the trace is stopped at the time when the system is not performing optimally. The traces can subsequently be analyzed to understand the mechanisms that are causing the system degradation. Once the mechanism is understood, the system configuration can be updated, an application can be recoded, and/or the system can be redesigned to modify the performance-limiting attributes.

Figure 7:
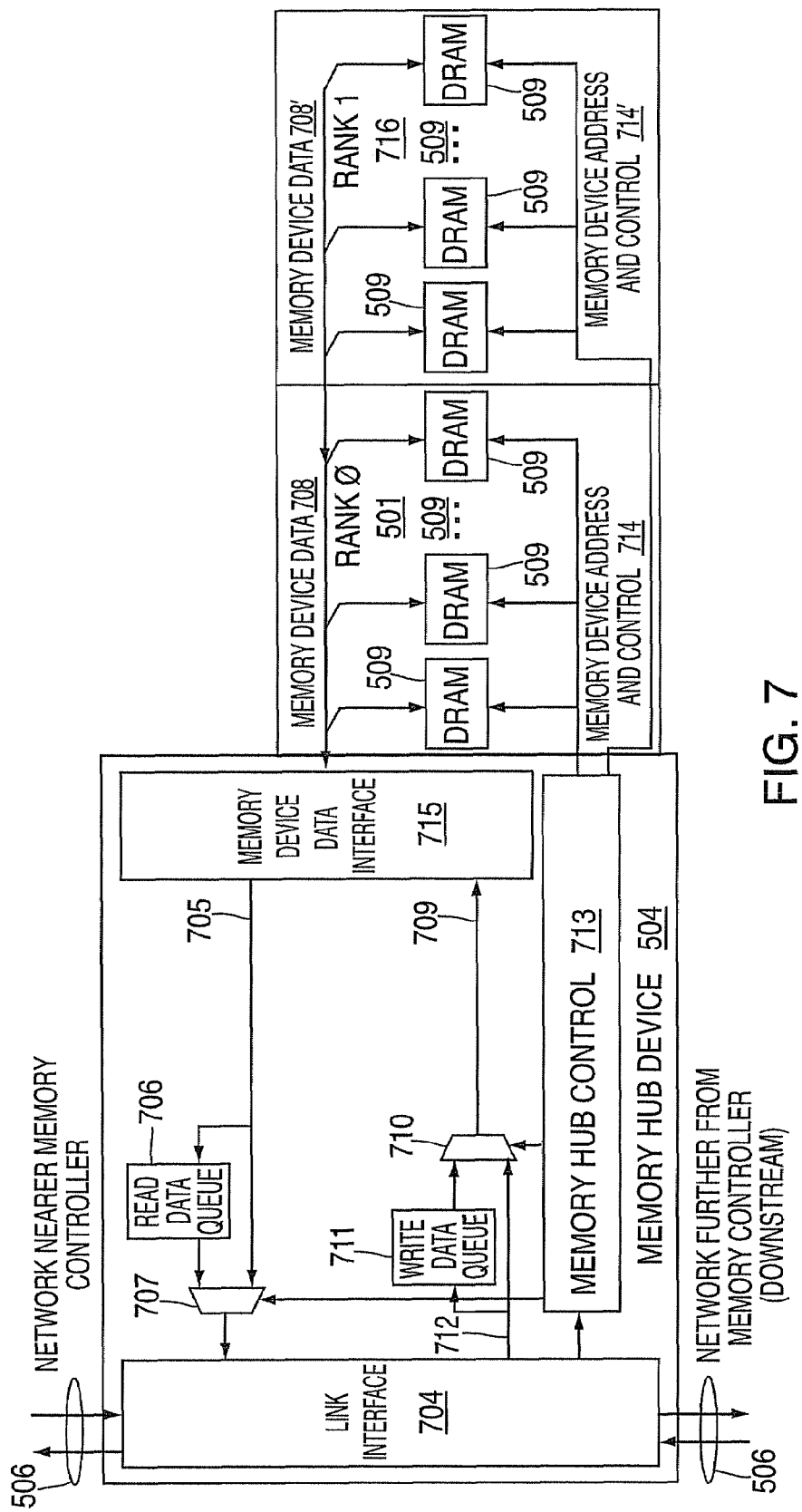
FIG. 7 is a block diagram of an exemplary hub device in a memory subsystem.

The hub device 504 in FIG. 8 performs the same functions described above with reference to FIG. 7 along with the addition of the functions provided by the collision detection logic 802 as described herein. FIG. 8 includes collision detection logic 802 located in the memory hub device 504 for providing the collision detection functions described herein. In exemplary embodiments, the collision detection logic 802 includes three components: resource scheduling conflict logic for detecting resource scheduling conflicts; error reporting logic for generating an alert, or error signal 804, if a resource scheduling conflict is detected; and trace array logic for recording the input command stream (e.g., address and commands) received at the hub device 504 when collision detection is enabled. In exemplary embodiments, collision detection logic 802 is located inside a hub device 504 alongside circuits that are decoding and/or executing memory commands. The collision detection logic 802 "snoops" the activities on selected resources to determine when/if collisions will occur. Collisions are also referred to herein as "resource scheduling conflicts." The collision detection logic 802 may be utilized when bringing up the memory system/subsystem and for diagnosing problems in real time. The collision detection logic 801 generates an error signal 804 if a resource scheduling conflict is detected on any monitored resources. The alert data associated with the error signal 804 may be utilized to validate functionality, facilitate fault isolation and/or improve the overall reliability, availability, and serviceability (RAS) of the memory system.

Operational characteristics/parameters reflecting memory structures and device characteristics (also referred to as configuration information) are collected for the resources being monitored. Input to the collision detection logic 802 includes commands and configuration information. The commands from the memory controller 510 are decoded to determine resources utilized during the execution of the operation(s) described by the command/address decode. If a collision is detected, the collision detection logic 802 generates an error signal 804. The error signal 804 can connect to a separate low speed bus (I2C, SMBus, etc.) and/or through other bus means or even connect to link interface 704 and report errors on the high speed memory bus 506. In exemplary embodiments, the error signal 804 is transmitted to one or more monitoring devices, such as, but not limited to: a processor, a service processor and the memory controller 510. In alternate exemplary embodiments, the error signal 804 is read at the memory hub device 504 (e.g., via a bus) by one or more monitoring devices, such as, but not limited to: a processor, a service processor and the memory controller 510.

Figure 9:
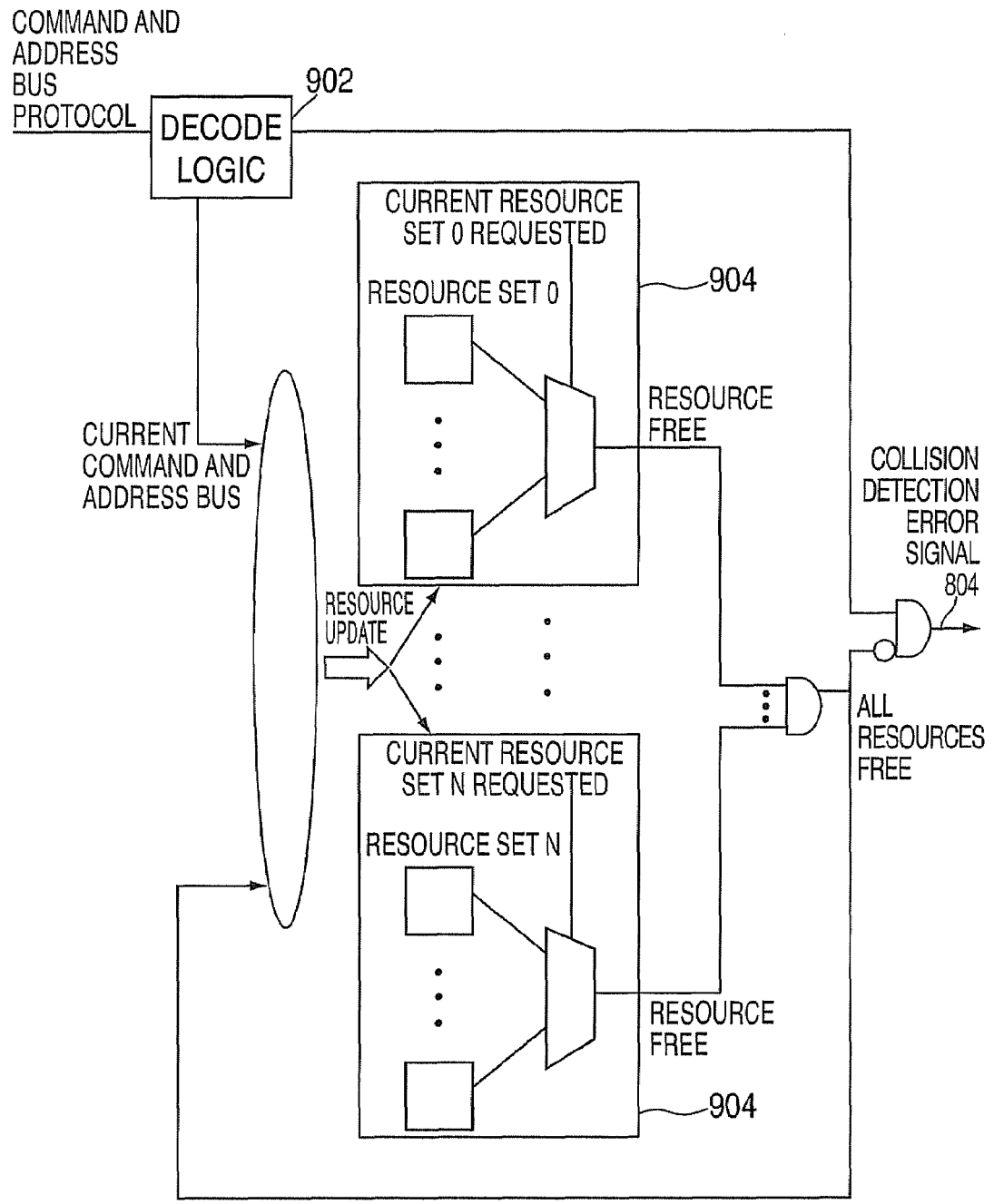
FIG. 9 is a block diagram of a collision detection framework that may be implemented by exemplary embodiments.

FIG. 9 is a block diagram of a collision detection framework that may be implemented by exemplary embodiments. In exemplary embodiments, the block diagram depicted in FIG. 9 is implemented by the collision detection logic 802. Each memory resource in the memory system is abstracted to a resource set 904 (e.g., resource set 0 ... N). A status of each of the resources in the resource set 904 is maintained to determine when an illegal sequence (also referred to as a resource scheduling conflict or collision) has been received. If an illegal sequence is received, then the error is recorded and the system is notified of the error (e.g., via the error signal 804). In various embodiments, the system error notification could include all details associated with the illegal sequence or the system error notification, or error signal 804, may simply include notification of the error. Further, the system may respond to the notification by performing actions such as interrogating a register containing the state information of the resource prior to and during the illegal operation. A few examples follow.

In exemplary embodiments, one or more FSMs monitor the state of the DRAM 509, and record and track all requested changes to the memory state due to the receipt of commands resulting in operations such as memory bank activate, bank read, bank write, bank precharge, refresh, self-refresh entry/exit, power-down entry/exit, and includes a record of state transition times associated with each of these state transitions. An FSM for a resource may include one or more counters and/or arrays to track the state of the resource. Each FSM could be implemented on a per bank and/or rank basis, and the total number of similar FSM's would comprise a resource set 904. When a command is received, the command is decoded by the decode logic 902 to determine the resource(s) that will be affected by the command. The decoded command is then forwarded to the FSMs of the affected resource set(s) 904, which determine if the resource(s) are in a state that will permit the intended operation. If the resource(s) is not available for the intended operation, then the resource is not free. If a command is received and targets a resource that is not free, a collision detection error signal 804 is reported and/or recorded.

A multiplicity of resource sets 904 can be implemented to monitor ranks, banks, etc. in the memory system with these resource sets generally being identical in construction although applying to a different address, chip select or alternate selection range. A received command is valid only if all the targeted resources will be free at the time the command is to be executed, among all the resource sets 904. If the received command can be executed without resource conflicts, then the affected FSMs are updated to record the execution of the command. If any one of the resource sets 904 is not free when the command is to be executed, then an error condition is asserted via, for example, an error signal 804. Examples of attributes that may be reported include: the command that caused the fail, and which resource set had the conflict (bank, rank, bus turn-around, etc.). For resources having multiple resource sets 904 (such as a memory module having multiple ranks or a memory device having multiple banks), the critical identifier (e.g., the rank address or bank address) may also be reported.

Other exemplary embodiments implemented by the block diagram depicted in FIG. 9 include an FSM that monitors the memory device data bus 708 turn around time between the hub device 504 and the memory device(s) 509. In the case where there is only one memory device data bus 708 (such as in a single rank memory module), there is no need for a system address to determine which of the data buses is being used since there is only one data bus. As such, the activity on the one memory device data bus 708 will be monitored to identify any bus conflicts that may occur. In this example, the memory device data bus 708 is scheduled when either writes or reads occur to the memory devices 509. The memory device data bus 708 will be scheduled for a configurable amount of time with respect to each command, and will include such factors as the data transfer length (e.g. burst length), the latency between the command receipt and the associated data transfer (read latency, write latency), any required bus pre-conditioning time, etc. More time may be allocated to the command when the ownership of the memory device data bus 708 must be transferred from the hub device 504 to the memory device 509, such as cases where the bus must be returned to a specified condition (e.g. a voltage range) so that the device functional and/or performance specifications can be met. If the controller 510 issues a command sequence of reads and/or writes that are too close together, the bus turnaround resource will flag an overlap condition and raise an error.

Figure 10:
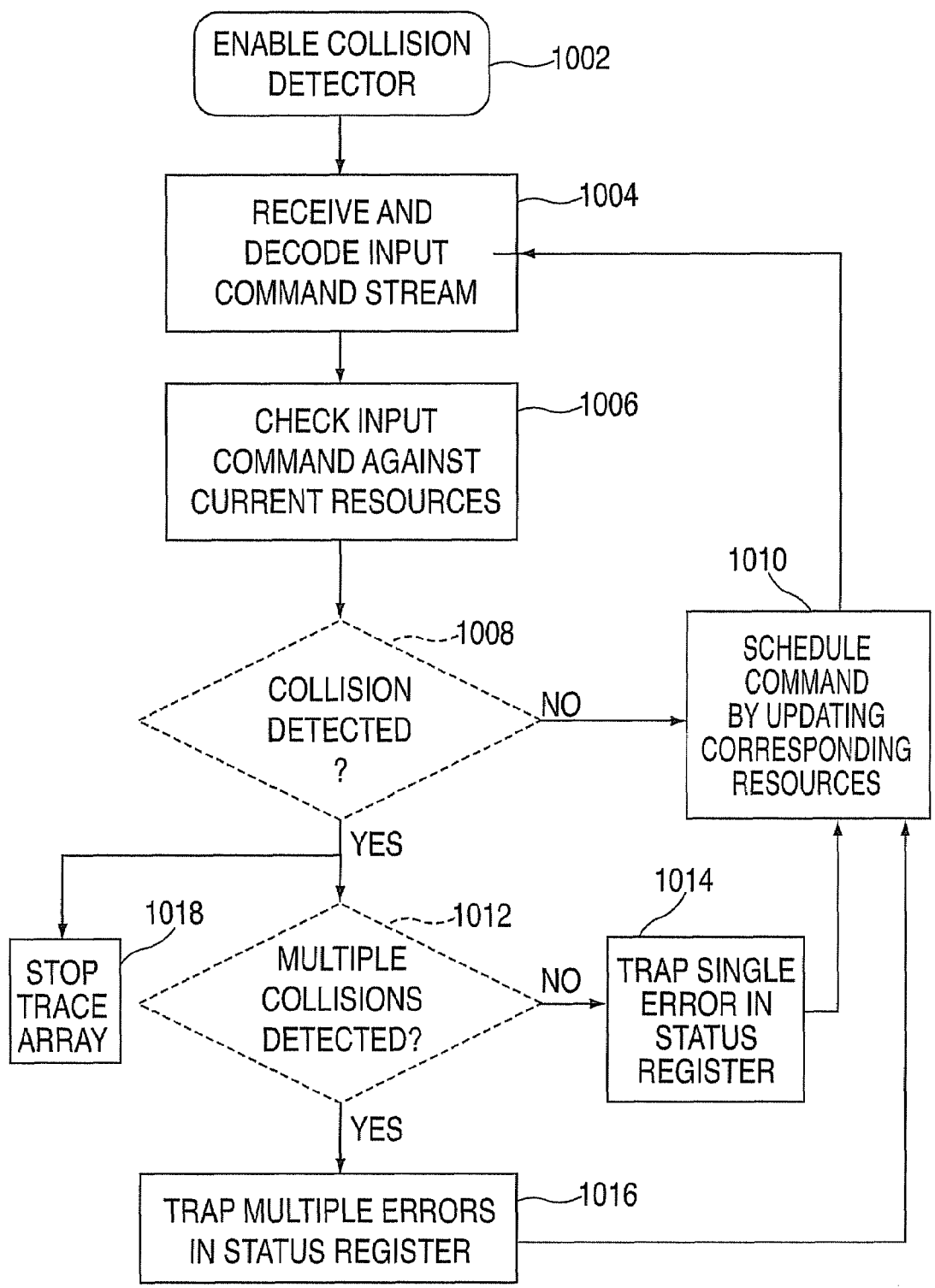
FIG. 10 depicts a process flow for performing collision detection that may be implemented by exemplary embodiments.

FIG. 10 depicts a process flow for performing collision detection that may be implemented by the collision detection logic 802 in exemplary embodiments. In exemplary embodiments, the collision detection logic 802 monitors commands received at the hub device 504. The collision detection logic 802 detects a command(s) (e.g., from the memory controller) and decodes the command to determine the resources utilized by the command. Resource information stored in FSMs (e.g., counters and arrays) is updated in response to the command. The collision detection logic 802 checks for any collision problems and reports any collisions detected. If no collisions are detected, the collision detection logic 802 continues to monitor the commands received at the hub device 504.

At block 1002 in FIG. 10, the collision detection logic 802 is enabled, and optionally the trace array can be enabled as well, generally upon completion of an initial power-up sequence, the programming of any programmable register settings to include the resource start and reserve time specifications (i.e., the scheduling rules), the resetting of the trace array, the completion of interface training and/or other related start-up operations. At this point, the collision detector mirrors the legal operations/sequences/timings of the memory subsystem, or hub device 504, and begins to monitor and record operations in the memory subsystem to identify and log (and/or report) any invalid operations based on the settings in resource tables in conjunction with FSMs that include resource counter(s) and shift register(s) (see FIG. 12 and accompanying description below).

At block 1004, an input command stream is received and decoded to identify the resources and/or the resource set(s) to be utilized during the execution of a command in the input stream. At block 1006, the counters and/or shift registers, and/or FSM's containing state information related to the resource(s) are updated to reflect the resource utilization associated with the new memory command. If a collision, or resource scheduling conflict, is detected at block 1008. In a parallel path, if the trace array is enabled, then when the collision is detected the trace array should be stopped in block 1018. In the other parallel path, block 1012 is performed to determine if multiple collisions are detected. If multiple collisions are detected, as determined at block 1012, then block 1016 is performed to trap multiple errors in a status register. As described previously, the status register (or error signal) may be used to report all details associated with the illegal sequence, generally including a notification of the error and/or state information of the resource prior and during the illegal operation. Processing continues at block 1010. If only a single collision is detected, as determined at block 1012, then block 1014 is performed to trap the single error in the status register. Processing continues at block 1010. If a collision was not detected at block 1008, then block 1010 is performed to schedule the command by updating the FSMs associated with the corresponding resources. As described previously, the collision detection logic 802 does not actually cause the command to be executed, but instead tracks the impact on the resources if the command is executed by updating one or more FSMs associated with the command. Although not shown, an error signal 804 may be generated at the time the collision is detected at block 1008, shortly thereafter, at a normally scheduled status update time, in response to a 'read status register' request, or at some other time. In addition, the memory subsystem may be designed and/or programmed to block execution of the new command after a collision is detected, rather than continuing operation, as is shown in the exemplary embodiment. In exemplary embodiments, the processing depicted in FIG. 10 is performed by collision detection logic 802 contained in the hub device 504.

Figure 11:
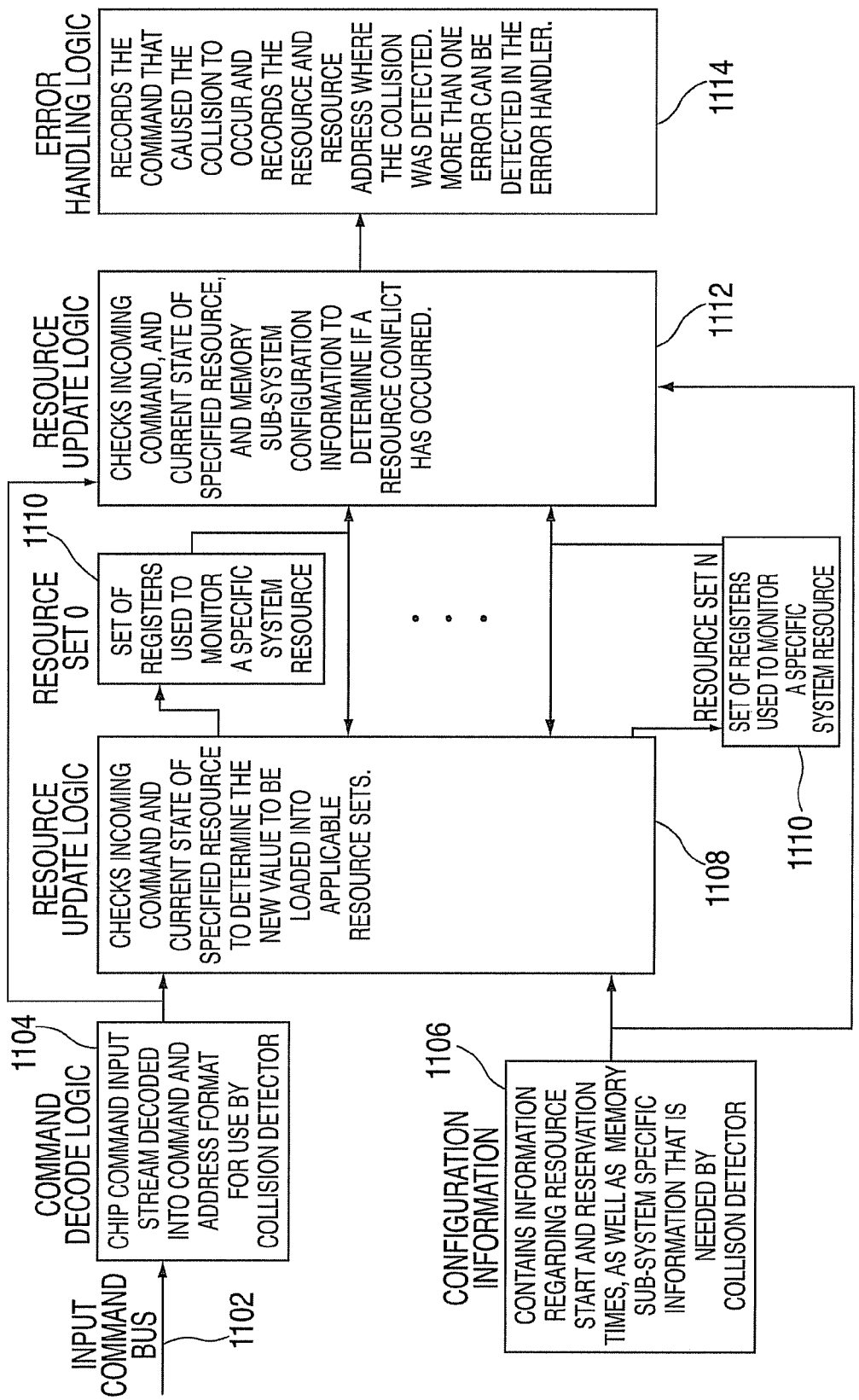
FIG. 11 depicts processing blocks that may be implemented by exemplary embodiments to perform collision detection.

FIG. 11 depicts processing blocks that may be implemented in exemplary embodiments by collision detection logic 802 located in a hub device 504 to perform collision detection. The logic design methods and/or exemplary circuitry to implement the functions described herein are well known to those skilled in the art, and are therefore, not included in this description. The command decode logic block 1104 "snoops" the memory hub control 713 to obtain the hub device command input stream information, as received by the hub device 504. The command decode logic block 1104 determines the resources utilized by the command. The command decode logic block 1104 forwards command information (e.g., resources utilized) that relates to the memory subsystem elements such as the local hub device 504, memory device(s) 509 and/or interface bus(es) 714 708 to the resource update logic block 1108. The resource update logic block 1108 checks the incoming command and the current state of the specified resource(s) to determine the new value(s) to be assigned to the affected resource (sets). The resource sets 1110 are then updated to reflect the addition of the new command. The resource sets 1110 include FSMs (e.g., counters, arrays) for each resource in the resource set 1110. Input to the resource update logic block 1108 is received from the configuration information block 1106. In exemplary embodiments, the configuration information block 1106 includes information regarding resource start and reservation times and memory sub-system specific information, as described in the text associated with FIG. 10.

In parallel with updating the resource set(s) 1110, a determination is made in the resource update logic block 1112 as to whether a resource conflict has occurred due to the receipt of the new command. If a conflict/collision is identified, the error handling logic block 1114 is utilized to record the resource information related to the conflict, and may further initiate error reporting logic activity.

Configuration registers containing configuration data (or configuration information) that is included in the configuration information block 1106 may reside in the collision detection logic 802, may be shared registers in the hub device 504 used to program the memory hub control block 713, or may reside elsewhere in the hub device 504 or in a related device. The configuration registers are generally loaded via the high speed link interface or an alternate bus (such as an I2C bus, an SMBus or another bus generally used for purposes other than high speed data transfers between the memory controller and the memory subsystem(s)). The configuration information is utilized as an input to the resource update logic block 1108 to determine the appropriate information to be loaded in to the counters/shift registers and in the determination of resource conflicts.

Figure 12:
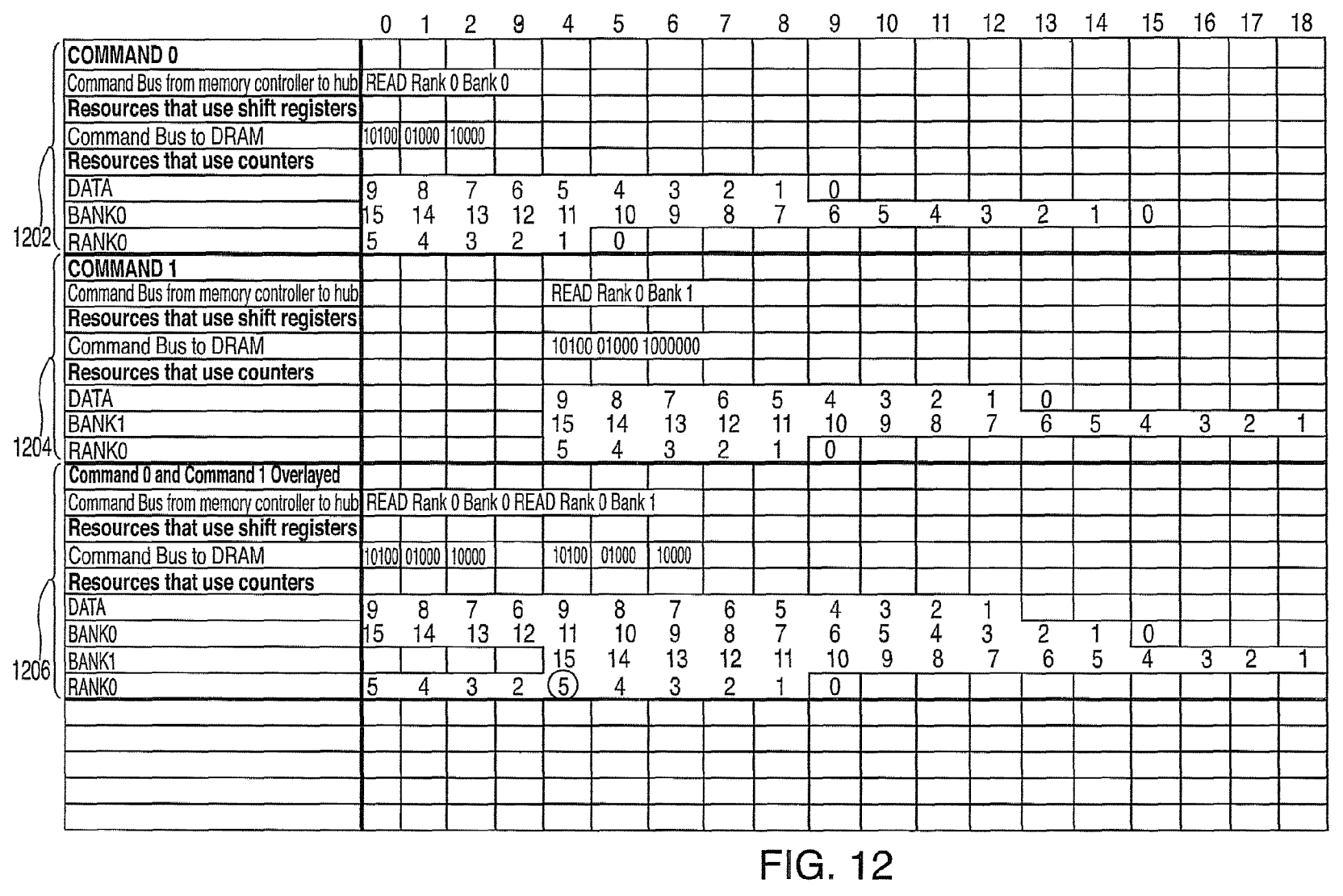

FIG. 12 includes timing diagrams that may be implemented by exemplary embodiments of the collision detection logic 802 to determine if there are resource scheduling conflicts. Timing diagram one 1202, timing diagram two 1204, and timing diagram three 1206 are depicted to illustrate the usage of FSMs (e.g., counters and shift registers) to monitor multiple resource sets of a memory system. The memory structure associated with this example includes at least one rank 501 716 of memory devices 509 having a single command bus 714 to each of the memory devices 509 in that rank and two (or more) banks on each memory device 509 in the rank. In this example, the one rank of memory devices 509, two banks on those devices and the associated command bus 714 are monitored for collisions. Timing diagram one 1202 shows how a single read command to RANK0 BANK0 is scheduled. Timing diagram two 1204 shows how a single read command to RANK0 BANK1 is scheduled. Timing diagram three 1206 shows the first two timing diagrams superimposed on each other and shows the location of a collision that is detected.

In exemplary embodiments, to implement the collision detection logic 802, each resource set 1110 is monitored by using a set of counters and/or shift registers (also referred to herein as FSMs). The scheduling rules are different based upon the usage of a counter or a shift register. For this example, the following rules apply:

(1) For any resource that uses a counter. The resource start time associated with an operation resulting from a new command must be greater than or equal to the value in the counter at the current clock cycle. If the resource start time is greater than or equal to the current value in the counter, then the counter is updated to contain the value of the sum of resource start time and the resource width time for the new command. If the resource start time is not greater than or equal to the current value in the counter, then a collision will be registered. For the counter and shift register resources, it is important to include the resource start time as well as the resource (utilization) width time due to the fact that different commands can access the same resource with different start latencies. In these cases it is necessary to know the difference in start time as that will change the time when the resource is utilized.

(2) For any resource that uses a shift register. The shift register locations that are to be loaded must be a 0 at the time of load. If the shift register locations associated with a new command sequence are '0', then these locations in the shift register are set to a 1. If the shift register locations associated with a new command sequence are not '0', then a collision will be registered.

(3) For any resource that uses an FSM to monitor state. The FSM's that are to be updated must follow a pre-defined state diagram which defines all permitted resource state transitions. The state is updated based on the input command. At the same time, a check is performed to make sure the received command is allowed given the current state of affected resource(s). If the command received is not allowed during the current state, a collision will be registered. In this manner the bank state/DRAM state may be tracked.

The rules described above are examples of possible ways of detecting a collision, however other methods and rules can be used for detecting collisions.

In exemplary embodiments, the following tables are used for the timing diagram examples to show exemplary values for the resources that may be selected. Note that in general use, the resource start times and reserve times (i.e., the scheduling rules) are set up prior to normal operation—before the collision detector circuit is used; however it is possible that they could be dynamically updated during runtime. The start and width (reserve) times and rules can be configurable based on chip settings, can be calculated by an equation based on DRAM timings, and/or can be set via an override value in a register. In general, the scheduling rules reflect operational characteristics of the resources and as they interact with each other on the hub device 504. In this example, the values are chosen to describe an exemplary implementation.

TABLE 1

Counter Resource Start and Reservation Times

| | Start | Width | Counter Value to Load |
|---|---|---|---|
| Data Bus Read | 5 | 4 | 9 |
| Bank Read | 0 | 15 | 15 |
| Rank Read | 0 | 5 | 5 |

The start column in Table 1 indicates how long after the command is issued that the resource begins to be used. The width column indicates how long (in clock cycles) the operation(s) resulting from the command will last. The counter value to load column indicates the total elapsed time from issue to completion for the command and is utilized to set the counter value for the particular resource.

TABLE 2

Shift Register Resource Start and Reservation Times

| | Start | Width | Shift Register Locations to Load |
|---|---|---|---|
| Command Bus Read | 0, 2 | 1 | 0, 2 |

The start column in Table 2 specifies when (e.g., which clock cycles) the command bus 714 is utilized. In the example in Table 2, when the command bus 714 receives a command, it is busy for the first cycle (0) and the third cycle (2) (e.g. when associated with a row and column address transfer to memory), both for a width of one. Thus, the shift register locations to load column indicates that a one should be placed in positions (0) and (2) of the array to indicate that the command bus 714 is busy during these clock cycles.

Timing diagram one 1202 and timing diagram two 1204 relate to the scheduling mechanism. Both of these timing diagrams assume no commands have been received previously and therefore all of the resources in the system are currently free. In timing diagram one 1202, the READ RANK0 BANK0 command is decoded on cycle 0. Based on this input command, the command bus to DRAM, data bus, RANK0, and BANK0 resources must be reserved for the time periods in which the current input command will utilize these resources. The counter resources (data bus, rank, bank) are all set to the value specified in the "Counter Value to Load" column of the Table 1. The command bus shift register bits 0 and 2 are set to a 1 as specified by the Table 2, as indicated in the sequence '10100' in the 4th row under Command 0.

As depicted in timing diagram one 1202, during each new clock cycle, the counters are decremented, and the shift register(s) is shifted (as evident via the value of '01000' in cycle number 1 and '10000' in cycle number 2 for the shift register). Once each counter reaches 0, the counters no longer decrement, they hold the value of zero. The shift register continuously shifts, and a value of '0' in any position indicates that the resource is unused for that cycle. The shift register is shown as comprising 5 bit positions, but may include additional bit positions to permit the scheduling of commands with greater latency values.

Timing diagram two 1204 shows a very similar response to a READ RANK0 BANK1 command. The only differences in this example are that BANK1 is being accessed instead of BANK0, and the cycle during which the command is decoded is now cycle 4.

Timing diagram three 1206 superimposes both timing diagram one 1202 and timing diagram two 1204 in a single timing diagram to show how a collision is detected using the rules for counters and shift registers previously described in this example. The initial input command at cycle 0 is scheduled as previously described, as there were no existing commands that might create a conflict at the time this command was received. With the receipt of Command 1, however, a conflict is recorded at cycle 4, associated with the RANK0 resource. This conflict is due to the violation of the counter rule by Command 1, associated with RANK0. In the exemplary embodiment, the collision detector does a resource conflict check in parallel with any counter/shift register load action.

The following summarizes the resource conflict checks for each of the resources involved with Command 0 and Command 1: the command bus has no collision at cycle 4 since shift register locations 0 and 2 were both 0 at the time of the shift register load; the data bus had no collision at cycle 4 because the data bus start time of 5 (associated with Command 1, as shown in Table 1) was equal to the current counter value of 5 (associated with Command 0); BANK1 had no collision because it was not previously used, and therefore had a value of 0; and RANK0 had a collision because the rank read start time of 0 was not greater than or equal to the current counter value of 1 (associated with Command 0). By delaying Command 1 by one cycle, there would be no collisions associated with this command sequence, as the RANK0 counter would then have a value of 0 at the time the new command was loaded into the counter.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to detect invalid command streams during initial system bring up and testing, allowing for faster initial debug of the memory system. Further, during subsequent stress test cases, the hardware conflict detection can facilitate the detection of infrequent resource scheduling conflicts that occur when the system is tested with multiple programs and/or temperature extremes (which may result in resource conflicts that do not occur in normal operation). This may lead to a faster time to market. In addition, the collision detection provides an extra level of RAS during normal system operation by checking the resources at all times and reporting conflicting sequences of commands that only occur during very specific conditions.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory system for storing and retrieving data for a processing system, the memory system comprising:
   one or more memory devices;
   resource scheduling conflict logic for monitoring one or more memory resources for detecting resource scheduling conflicts, wherein the resource scheduling conflict logic is pre-conditioned at power-up to include scheduling rules for the memory resources being monitored, the scheduling rules modifiable during operation of the memory system; and
   error reporting logic in communication with the resource scheduling conflict logic, the error reporting logic for generating an error signal in response to detecting a resource scheduling conflict at one or more of the memory resources.

2. The memory system of claim 1 further comprising trace array logic for recording an input command stream, wherein the trace array logic is stopped in response to detecting the resource scheduling conflict.

3. The memory system of claim 1 further comprising a memory controller, wherein the resource scheduling conflict logic is located remote from the memory controller.

4. The memory system of claim 1 wherein the memory resources include one or more of a downstream memory channel, an upstream memory channel, a memory device internal state, a memory device internal bank usage, a memory device rank usage, a memory device command bus, and a memory device data bus.

5. The memory system of claim 1 wherein the error signal is transmitted to one or more of a processor, a service processor, and a memory controller.

6. The memory system of claim 1 wherein the error signal is readable by one or more of a processor, a service processor, and a memory controller.

7. The memory system of claim 1 wherein the resource scheduling conflict logic includes one or more finite state machines (FSMs) for tracking activity within the memory resources being monitored.

8. The memory system of claim 7 wherein the FSMs are configurable to accommodate varying memory structures and device characteristics associated with the memory resources being monitored.

9. A memory hub device comprising:
   one or more interfaces to access one or more memory resources;
   resource scheduling conflict logic for monitoring the one or more memory resources for detecting resource scheduling conflicts, wherein the resource scheduling conflict logic is pre-conditioned at power-up to include scheduling rules for the memory resources being monitored, the scheduling rules modifiable during operation of a memory system associated with the memory hub device; and
   error reporting logic in communication with the resource scheduling conflict logic, the error reporting logic for generating an error signal in response to detecting a resource scheduling conflict at one or more of the memory resources.

10. The memory hub device of claim 9 further comprising trace array logic for recording an input command stream, wherein the trace array logic is stopped in response to detecting the resource scheduling conflict.

11. The memory hub device of claim 9 wherein the memory resources include one or more of a downstream memory channel, an upstream memory channel, a memory device internal state, a memory device internal bank usage, a memory device rank usage, a memory device command bus, and a memory device data bus.

12. The memory hub device of claim 9 wherein the error signal that is transmitted to one or more of a processor, a service processor, and a memory controller.

13. The memory hub device of claim 9 wherein the error signal that is readable by one or more of a processor, a service processor, and a memory controller.

14. The memory hub device of claim 9 wherein the resource scheduling conflict logic includes one or more FSMs for tracking activity within the memory resources being monitored.

15. The memory hub device of claim 14 wherein the FSMs are configurable to accommodate varying memory structures and device characteristics associated with the memory resources being monitored.

16. A memory system for storing and retrieving data for a processing system, the memory system comprising:
   a memory controller for receiving and responding to memory access requests;
   a plurality of memory devices;
   a memory bus in communication with the memory controller; and
   a memory hub device in communication with the memory bus, the memory hub device comprising:
      a memory interface for transferring data and control information between the memory hub device and the memory controller via the memory bus;
      a memory device interface for communicating with the memory devices; and
      resource scheduling conflict logic for monitoring one or more of the memory devices, the memory bus, and the memory device interface for resource scheduling conflicts, wherein the resource scheduling conflict logic is pre-conditioned at power-up to include scheduling rules for the memory resources being monitored, the scheduling rules modifiable during operation of the memory system.

17. The memory system of claim 16, wherein the hub device further comprises error reporting logic for generating an error signal in response to detecting a resource scheduling conflict.

18. The memory system of claim 16, wherein the hub device further comprises trace array logic for recording an input command stream, wherein the trace array logic is stopped in response to detecting a resource scheduling conflict.

19. A method for providing collision detection in a memory system, the method comprising:

receiving a new memory command;

determining memory resources associated with the new memory command;

comparing the new memory command to current memory activity using resource scheduling conflict logic to determine if a resource scheduling conflicts exists at the memory resources associated with the new memory command, wherein the resource scheduling conflict logic is pre-conditioned at power-up to include scheduling rules for the memory resources being monitored, the scheduling rules modifiable during operation of the memory system; and generating an error signal in response to determining that a resource scheduling conflict exists.

20. The method of claim 19 further comprising monitoring an upstream memory channel for new memory commands.

21. The method of claim 20 further comprising recording contents of the upstream memory channel using trace array logic, wherein the trace array logic is stopped in response to determining that the resource scheduling conflict exists.

22. The method of claim 19 wherein the memory resources include one or more of a downstream memory channel, an upstream memory channel, a memory device internal state, a memory device internal bank usage, a memory device rank usage, a memory device command bus, and a memory device data bus.

* * * * *